(12) United States Patent
Ma et al.

(10) Patent No.: US 12,349,015 B2
(45) Date of Patent: Jul. 1, 2025

(54) SELF-OPTIMIZATION METHOD AND DEVICE

(71) Applicant: SAMSUNG ELECTRONICS CO., LTD., Suwon-si (KR)

(72) Inventors: Xiaoning Ma, Beijing (CN); Lixiang Xu, Beijing (CN); Hong Wang, Beijing (CN); Weiwei Wang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 382 days.

(21) Appl. No.: 17/759,280

(22) PCT Filed: Jan. 20, 2021

(86) PCT No.: PCT/KR2021/000789
§ 371 (c)(1),
(2) Date: Jul. 21, 2022

(87) PCT Pub. No.: WO2021/150014
PCT Pub. Date: Jul. 29, 2021

(65) Prior Publication Data
US 2023/0109338 A1 Apr. 6, 2023

(30) Foreign Application Priority Data

Jan. 23, 2020 (CN) .......................... 202010076371.3
Oct. 21, 2020 (CN) .......................... 202011133694.3

(51) Int. Cl.
*H04W 36/00* (2009.01)
*H04W 24/02* (2009.01)

(52) U.S. Cl.
CPC ....... *H04W 36/0079* (2018.08); *H04W 24/02* (2013.01); *H04W 36/0069* (2018.08)

(58) Field of Classification Search
CPC .............. H04W 36/08; H04W 36/362; H04W 36/0079; H04W 24/02; H04W 36/0069; H04W 76/15
See application file for complete search history.

(56) References Cited

U.S. PATENT DOCUMENTS

| | | | | |
|---|---|---|---|---|
| 2021/0099926 | A1* | 4/2021 | Chen | H04W 36/08 |
| 2022/0217586 | A1* | 7/2022 | Yang | H04W 36/0027 |
| 2022/0345951 | A1* | 10/2022 | Ma | H04W 76/18 |
| 2022/0353769 | A1* | 11/2022 | Wang | H04W 36/0058 |

(Continued)

FOREIGN PATENT DOCUMENTS

| | | |
|---|---|---|
| WO | 2018203710 A1 | 11/2018 |
| WO | 2018231136 A1 | 12/2018 |

OTHER PUBLICATIONS

Supplementary European Search Report dated Sep. 29, 2023, in connection with European Patent Application No. 21743957.9, 12 pages.

(Continued)

*Primary Examiner* — Raj Jain

(57) ABSTRACT

A self-optimization method in a radio communication system is disclosed. The method comprises: determining, by a second node, a type of secondary node (SN) change failure based on a first message received from a first node, and transmitting, by the second node, a second message to a node that triggers a SN change to perform a self-optimization configuration.

10 Claims, 19 Drawing Sheets

(56) References Cited

U.S. PATENT DOCUMENTS

2023/0007552 A1\* 1/2023 Sun .................... H04W 36/362
2023/0109338 A1\* 4/2023 Ma .................... H04W 36/0079

OTHER PUBLICATIONS

CATT, "Bearer type negotiation," 3GPP TSG-RAN WG2 Meeting #108, R2-1914533, Reno, USA, Nov. 2019, 8 pages.

ZTE Corporation et al., "Consideration on DRX coordination in ANR," 3GPP TSG-RAN WG2 Meeting #108, R2-1914909 (revision of R2-1912769), Reno, USA, Nov. 2019, 6 pages.

International Search Report and Written Opinion of the International Searching Authority in connection with International Application No. PCT/KR2021/000789 issued Apr. 19, 2021, 9 pages.

ZTE, "Detection solution for SN change failure," R3-197103(Revision of R3-195719), 3GPP TSG-RAN WG3 #106, Reno, USA, Nov. 18-22, 2019, 5 pages.

Samsung, "(TP for SON BL CR for TS 38.423) XnAP impacts for the solution of SN change failure," R3-197137, 3GPP TSG-RAN WG3 #106, Reno, USA, Nov. 18-22, 2019, 14 pages.

ZTE, "(TP for [NR_SON_MDT] BL CR for TS 38.300) Detection solution for SN change failure," R3-195720 (Revision of R3-193878), 3GPP TSG-RAN WG3 Meeting #105bis, Chongqing, China, Oct. 14-18, 2019, 2 pages.

CATT, "Failure Indication about SCG," R2-1914502, 3GPP TSG-RAN WG3 #106, Reno, USA, Nov. 18-22, 2019, 3 pages.

Office Action issued Aug. 19, 2024, in connection with Chinese Patent Application No. 202011133694.8, 14 pages.

\* cited by examiner

SELF-OPTIMIZATION METHOD AND DEVICE

CROSS-REFERENCE TO RELATED APPLICATIONS

This application is a 371 of International Application No. PCT/KR2021/000789 filed Jan. 20, 2021, which claims priority to Chinese Patent Application No. 202010076371.3, filed Jan. 23, 2020, and Chinese Patent Application No. 202011133694.8, filed Oct. 21, 2020, the disclosures of which are herein incorporated by reference in their entirety.

BACKGROUND

1. Field

The present disclosure relates to a self-optimization method, and in particular, to a self-optimization method and device when a Secondary Cell Group (SCG) radio connection failure for a User Equipment (UE) occurs on a Secondary Node (SN).

2. Description of Related Art

To meet the increase in demand for wireless data traffic since the deployment of 4G communication systems, efforts have been made to develop improved 5G or pre-5G communication systems. Thus, the 5G or pre-5G communication systems are also called 'beyond 4G network' or 'post Long Term Evolution (LTE) systems. The 5G communication systems are being developed to be implemented in a higher frequency band (millimeter wave (mmWave)), e.g., a band of 60 GHz, so as to achieve a higher data rate. In order to reduce propagation loss and to increase a transmission distance of radio waves, technologies such as beamforming, massive multiple input multiple output (MIMO), full dimensional MIMO (FD-MIMO), array antennas, analog beamforming, and large scale antennas have been discussed in the 5G communication systems.

In the 5G or pre-5G communication systems, a user equipment (UE) may be in a dual-connectivity state, that is, the UE may establish a radio connection with an access node while establishing a radio connection with another access node. The access node may be a base station (including an eNB (evolved NodeB) or a ng-eNB (an eNB connected to the 5G core network)) that supports an air interface technology of the long-term evolution (LTE) technology, or it may be a base station (including a gNB or an en-gNB (gNB in E-UTRAN, if the eNB is the master base station, and the en-gNB serves as the secondary base station of the eNB) that supports the new air interface (NR), or it may be also be a base station that supports other air interface access technologies.

In the access nodes connected to the UE at the same time, one of the nodes is a Master Node (hereinafter referred to as a MN), and the other node is a Secondary Node (hereinafter referred to as a SN). FIG. 1 is a schematic diagram showing that a UE establishes a radio connection respectively with two access nodes at the same time. In FIG. 1, a core network, a master node (MN), a secondary node (SN), and a user equipment (UE) are shown. As shown in FIG. 1, the UE establishes a radio connection respectively with the master node and the secondary node at the same time, where the MN may be connected to the UE through the control plane shown by the solid line and the user plane shown by the dotted line, and the SN may be connected to the UE through the user plane shown by the dotted line. Here, the MN may be a node that provides radio connection services for the UE and is connected to the core network, including the eNB, the ng-eNB or the gNB, and the SN may be a node that provides radio connection services for the UE, including eNB, ng-eNB, en-gNB or gNB.

SUMMARY

Aspects and advantages of embodiments of the present disclosure will be set forth in part in the description which follows and, in part, may be apparent from the description, or may be learned by practice of the embodiments.

The UE may experience a SCG radio connection failure on the SN. However, as to how to find the failure, the cause or type of failure, and how to better optimize the configuration based on the results found to avoid subsequent possible failures, no overall solution has been proposed yet.

The present disclosure proposes a self-optimization method. According to the invention principles proposed in the present disclosure, failure information may be reported to the node where the error occurred, the cause of the failure may be identified, etc., and reasonable self-optimization may be performed accordingly. This avoids subsequent failures and improves the use experience of users of the UE.

The present disclosure proposes a self-optimization method for secondary node change failure. The method includes determining, by a second node, a type of secondary node (SN) change failure based on a first message received from a first node, and transmitting, by the second node, a second message to a node that triggered a SN change to perform a self-optimization configuration.

According to an aspect of the embodiments of the present disclosure, a self-optimization method for a secondary node change is provided.

According to the embodiments of the present disclosure, a self-optimization system in a radio communication system is provided, and the self-optimizing system may include: a first node; a second node; and a node that triggers a SN change, wherein the first node, the second node and the node that triggers the SN change may execute at least one of the methods as described above.

The above and other features, aspects and advantages of the various embodiments of the present disclosure will be better understood with reference to the following description and accompanying claims. The accompanying drawings of the specification constituting a part of the present disclosure illustrate example embodiments of the present disclosure, and together with the description, serve to explain related principles. The details of one or more implementations on the subject of the present disclosure are set forth in the accompanying drawings of the specification and the following description. Through the description, drawings, and claims, other potential features, aspects and advantages of the subject of the present disclosure will also become apparent.

BRIEF DESCRIPTION OF THE DRAWINGS

In the following description with reference to the accompanying drawings of the specification, a detailed description and discussion of one or more embodiments of the subject of the present disclosure are set forth to those of ordinary skill in the art, in which.

In the various drawings, the same or similar reference numerals and signs indicate the same or similar elements.

DETAILED DESCRIPTION

Definitions of certain words and terms are given in the description of this disclosure. Those of ordinary skill in the art should understand that in many cases (if not in most cases), such definitions apply to the use of such defined words and terms in various situations in the past and in the future. Unless explicitly stated otherwise, the terms used in the present disclosure have the same meanings as those understood by those of ordinary skill in the technical field to which the present disclosure belongs. For example, those terms defined in commonly used dictionaries should be interpreted as having the same meanings as those of the context in the related art, and should not be interpreted as having overly idealized or formalized meanings.

Although terms including ordinal numbers such as "first" and "second" are used to describe various elements (e.g., components, steps, etc.), these elements are not limited by these terms. These terms are only used to distinguish one element from another. Therefore, these terms may be used interchangeably without departing from the scope of the present disclosure. For example, a first element may be referred to as a second element, and similarly, the second element may also be referred to as the first element. In addition, as used herein, the terms "/", "or", "and/or" are intended to include any and all combinations of one or more related items.

By referring to the following detailed description of the various embodiments and the drawings of the specification, aspects and features of the present disclosure and the implementation thereof may be more clearly understood. However, the present disclosure may be embodied in many different forms and should not be construed as being limited to the various embodiments set forth herein. Rather, these embodiments are provided to make the disclosure sufficient and complete, and to fully convey the principles and concepts of the disclosure to those skilled in the art. Therefore, those of ordinary skill in the art should recognize that various modifications, adjustments, combinations, and substitutions may be made to the various embodiments described in the present disclosure without departing from the spirit and scope of the present disclosure. Moreover, these modifications, adjustments, combinations and substitutions should also be considered to be included in the protection scope of the present disclosure as defined by the claims.

Figure 1:
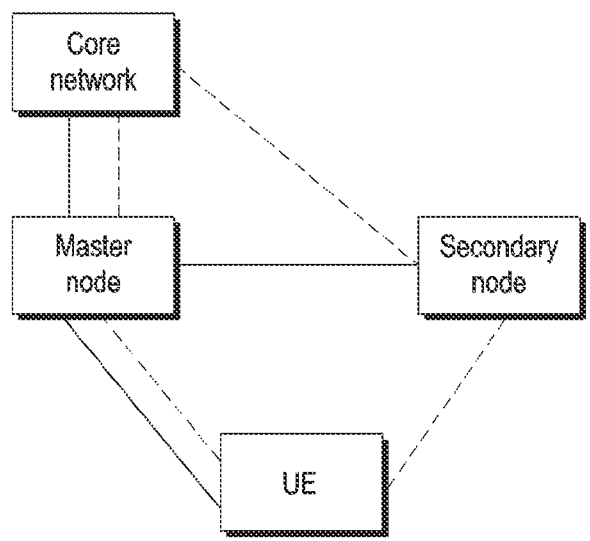
FIG. 1 is a schematic diagram showing that a UE establishes radio connections with two access nodes at the same time.
Figure 2:
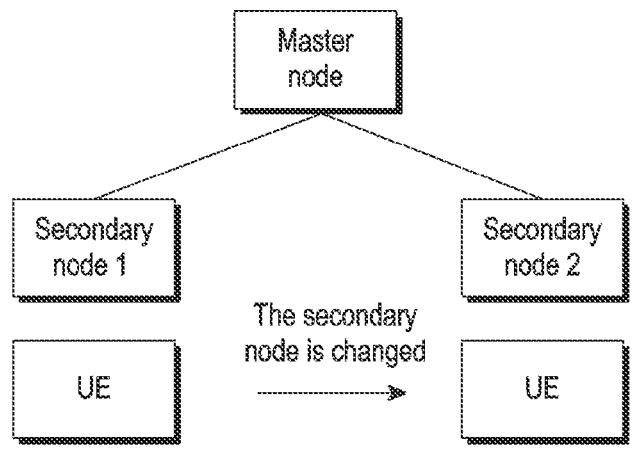
FIG. 2 is a schematic diagram showing that a UE is handed over from one secondary node to another secondary node.

FIG. 2 is a schematic diagram showing that a UE is handed over from one secondary node to another secondary node. In FIG. 2, a master node (wherein a core network is not shown), a secondary node 1 (SN1), a secondary node 2 (SN2) and a user equipment (UE) are shown. As shown in FIG. 2, the secondary node of the UE may be changed from the secondary node 1 to the secondary node 2. In such a secondary node change procedure, a change failure, i.e., a SN change failure, may occur. Therefore, notification of radio connection failure information to the node on which the SN change failure occurred, determination and identification of the cause or type of SN change failure, and report of the information to the node that initiated the SN change are made for a reasonable self-optimization, which is of positive significance to avoid occurrence of similar errors later and to improve the use experience of users of the UE.

Figure 3:
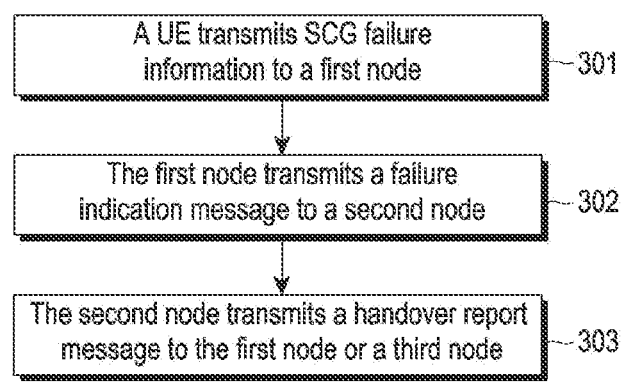
FIG. 3 is a flowchart showing a self-optimization method according to an exemplary embodiment of the present disclosure.

FIG. 3 is a flowchart showing a self-optimization method according to an exemplary embodiment of the present disclosure.

As shown in the figure, a first node may be a MN, a second node may be a SN where a SCG radio connection failure occurs, and a third node may be a source SN of the last SN change before the failure. A detailed description of some steps that may obscure the subject matter of the present disclosure is omitted here. The method includes steps:

Step 301: The UE transmits secondary cell group (SCG) failure information to the first node.

The SCG failure information includes one or a combination of the following information:

Cell identity of the PSCell of the SN where the SCG radio connection failure occurs, optionally, which may also include Tracking Area Code (TAC) and PLMN identity, or Tracking Area Identity (TAI) of the cell;

Cell identity of the PSCell of the source SN in the last SN change procedure, optionally, which may also include the TAC and PLMN identity, or the TAI of the cell;

Cell identity of a cell of the SN suitable for the UE to access after the SCG failure reported by the UE, optionally, which may also include the TAC and PLMN identity, or the TAI of the cell;

Time interval between the last SN change procedure and the SCG radio connection failure, which may be the time from last receipt of a RRC reconfiguration message including SN change information by the UE to the SCG failure, or the time from transmission of the RRC reconfiguration completion message by the UE to the SCG failure;

Type of SCG radio connection failure, which may be a SN change failure or a radio link failure;

C-RNTI allocated for the UE by the SN where the SCG radio connection failure occurs;

C-RNTI allocated for the UE by the MN; and

Measurement report of the UE.

After receiving the information, the first node may reconfigure the UE with a new SN.

Step 302: The first node transmits a failure indication message to the second node. The failure indication message may also be a secondary cell group (SCG) failure indication or other message for transmitting SCG failure information to the second node. The second node may be the SN where the SCG radio connection failure occurs. The first node knows the SN where the SCG radio connection failure occurs, according to the SCG failure information received from the UE, and the first node may also know the SN where the SCG radio connection failure occurs, according to the saved UE context information.

The message includes an information report of the SCG failure received from the UE, and the specific information is as described in step 301. The message includes information about whether the MN or SN triggered the last SN change procedure.

The message may also include one or a combination of the following information:

SCG failure information;

Information of the source SN of the last SN change, including cell identity of the PSCell, optionally, which may also include the TAC and PLMN identity, or the TAI of the cell;

Information of the SN where the SCG radio connection failure occurs, including cell identity of the PSCell, optionally, which may also include the TAC and PLMN identity, or the TAI of the cell;

Cell identity of a cell of the SN suitable to be configured for the UE after the SCG radio connection failure, optionally, which may also include the TAC and PLMN identity, or the TAI of the cell;

Time interval between the last SN change procedure and the SCG radio connection failure;

Identity allocated for the UE by the SN where the SCG radio connection failure occurs. The identity may be S-NG-RAN node UE XnAP ID in the Xn message or the SgNB UE X2AP ID in the X2 message, and may also be the C-RNTI;

Identity allocated for the UE by the MN. The identity may be M-NG-RAN node UE XnAP ID in the Xn message or the MeNB UE X2AP ID in the X2 message, and may also be the C-RNTI;

Type of SCG radio connection failure, which may be a SN change failure or a radio link failure;

Information list of the SNs connected by the UE or UE History Information including the information list of the SNs connected by the UE; and Mobility Information.

Step 303: The second node determines the cause of the failure, and the cause of the failure includes SN change too early, SN change too late, or SN change to wrong cell.

According to the information received in step 302, if the UE resides in the cell of the second node for a long time (no SN change has occurred recently), and there is a cell suitable for the UE to access at another SN for the UE when the failure occurs, then it is SN change too late. The cell suitable for the UE to access at the other SN may be transmitted by the UE to the first node and then transmitted by the first node to the second node, or determined by the second node based on the measurement report of the UE, or may be a cell at another SN configured for the UE decided by the first node, which is transmitted by the first node to the second node. The second node knows whether there is a recent SN change according to the time interval between the last SN change procedure and the SCG radio connection failure or according to the time difference between last receipt of RRC reconfiguration completion and failure indication.

For SN change too late, the second node may know that it or the MN should trigger a SN change procedure, but none of them do this, which causes the UE to fail on the SN, so the second node and the first node are both nodes that cause problems. The second node may be appropriately self-optimized. The second node transmits a handover report message to the first node. The handover report may also be a SCG handover report or other message, the message includes SN change too late, and the message includes the cell identity of the PSCell where the UE failed at the second node.

According to the information received in step 302, if the SN change has occurred recently for the UE, the SN where the source cell of the SN change is located is the SN suitable for the UE to access after the failure, or the source cell of the SN change is the cell of the SN suitable for the UE to access after the failure, then it is SN change too early. The second node knows whether there is a recent SN change according to the time interval between the last SN change procedure and the SCG radio connection failure or according to the time difference between last receipt of RRC reconfiguration completion and failure indication. The second node receives the source cell identity of the SN change from the first node in step 302. The cell suitable for the UE to access after the failure may be transmitted by the UE to the first node and then transmitted by the first node to the second node, or determined by the second node based on the measurement report of the UE, or may be a cell at another SN configured for the UE decided by the first node, which is transmitted by the first node to the second node.

For SN change too early, the second node transmits a handover report message to the first node for the last SN change triggered by the MN according to the information about whether the MN or the SN triggered the last SN change, received from the first node. The handover report may also be a SCG handover report or other message, and the message includes SN change too early, and the message includes the cell identity of the PSCell where the UE failed at the second node. For the last SN change triggered by the SN, the second node transmits a handover report message to the third node, i.e., the source SN. The handover report may also be a SCG handover report or other message, and the message includes SN change too early, and the message includes the cell identity of the PSCell where the UE failed at the second node and/or the cell identity of the PSCell of the source SN.

According to the information received in step 302, if the SN change has occurred recently for the UE, and the cell of the SN suitable for the UE to access after the failure is neither a cell of the source SN of the last SN change nor a cell of the SN where the failure occurs or a cell of the target SN of the SN change, it is SN change to wrong cell. The second node knows whether there is a recent SN change according to the time interval between the last SN change procedure and the SCG radio connection failure or according to the time difference between last receipt of RRC reconfiguration completion and failure indication. The second node receives the source cell identity of the SN change from the first node in step 302. The cell suitable for the UE to access after the failure may be transmitted by the UE to the first node and then transmitted by the first node to the second node, or determined by the second node based on the measurement report of the UE, or may be a cell at another SN configured for the UE decided by the first node, which is transmitted by the first node to the second node.

For SN change to wrong cell, the second node transmits a handover report message to the first node for the last SN change triggered by the MN according to the information about whether the MN or the SN triggered the last SN change, received from the first node. The handover report may also be a SCG handover report or other message, and the message includes SN change to wrong cell, and the message includes a cell identity of the PSCell where the UE failed at the second node, a cell identity of the PSCell of the source SN, and/or a cell identity of the PSCell on the SN suitable for the UE to access. For the last SN change triggered by the SN, the second node transmits a handover report message to the third node, i.e., the source SN. The handover report may also be a SCG handover report or other message, and the message includes SN change to wrong cell, and the message includes the cell identity of the PSCell where the UE failed at the second node, the cell identity of the PSCell of the source SN, and/or the cell identity of the PSCell on the SN suitable for the UE to access.

The message may also include one or a combination of the following information:

SCG failure information;

Type of SN change failure, which may be SN change too late, or SN change too early, or SN change to wrong cell;

Identity allocated for the UE by the SN where a SCG radio connection failure occurs. The identity may be the identity, S-NG-RAN node UE XnAP ID in the Xn message, or the identity, SgNB UE X2AP ID in the X2 message, and may also be C-RNTI;

Identity allocated for the UE by the MN. The identity may be the identity, M-NG-RAN node UE XnAP ID in the Xn message, or the identity, MeNB UE X2AP ID in the X2 message, and may also be C-RNTI;

Type of SCG radio connection failure, which may be a SN change failure or a radio link failure;

Cell identity of the PSCell of the source SN of the SN change, optionally, which may also include the TAC and PLMN identity, or the TAI to which the cell belongs;

Cell identity of the PSCell of a SN where a SCG radio connection failure occurs, optionally, which may also include the TAC and PLMN identity, or the TAI to which the cell belongs;

Cell identity of a cell of a SN suitable for access after the SCG radio connection failure, optionally, which may also include the TAC and PLMN identity, or the TAI to which the cell belongs; and Time interval between the last SN change procedure and the SCG radio connection failure;

Information list of the SNs connected by the UE, or UE History Information including the information list of the SNs connected by the UE; and Mobility Information.

The node that receives the handover report may determine the type of SN change failure according to the received information and/or saved information such as the information list of the SNs connected by the UE, and optimize the parameters used for generating a SN change decision so as to reduce or avoid the reoccurrence of similar errors. The node receiving the handover report may be the first node or the third node.

Figure 4:
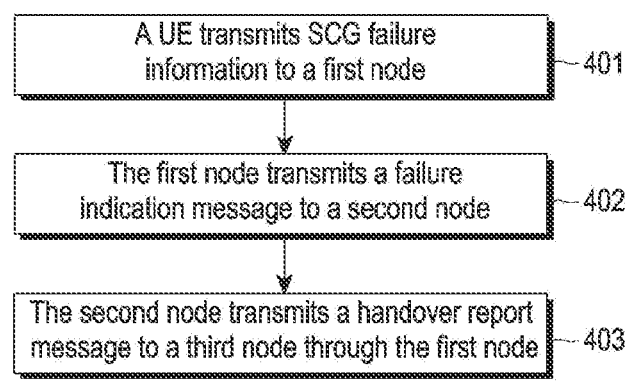
FIG. 4 is a flowchart showing a self-optimization method according to an exemplary embodiment of the present disclosure.

FIG. 4 is a flowchart showing a self-optimization method according to an exemplary embodiment of the present disclosure. As shown in the figure, a first node may be a MN, a second node may be a SN where a SCG radio connection failure occurs, and a third node may be a source SN of the last SN change before the failure. In this embodiment, the SN where the failure occurs transmits a handover report to the source SN through the MN. A detailed description of some steps that may obscure the subject of the present disclosure is omitted here. The method includes steps:

Step 401 to step 402 are similar to step 301 to step 302, and will not be repeated here.

Step 403: the method for the second node to determine the failure type is similar to that in step 303, and will not be repeated here. The processing for SN change too late is also similar to that described in step 303.

For SN change too early or SN change to wrong cell, the second node transmits a handover report message to the first node. The handover report may also be a SCG handover report or other message, and the message includes the wrong SN change, and the message includes a cell identity of the PSCell where the UE failed at the second node, a cell identity of the PSCell of the source SN, and/or a cell identity of the last cell of the SN suitable for the UE to access. For the last SN change triggered by the SN, the first node transmits a handover report message to the third node, i.e., the source SN. The handover report may also be a SCG handover report or other message, and the message includes SN change too early or SN change to wrong cell, and the message includes a cell identity of the PSCell where the UE failed at the second node, a cell identity of the PSCell of the source SN, and/or a cell identity of the last cell of the SN suitable for the UE to access.

The SN where the failure occurs may transmit a handover report to the source SN through the MN all the time, or transmit a handover report to the source SN through the MN when there is no horizontal interface (such as X2, Xn or other inter-base station interfaces) between the source SN and the SN where the failure occurs, and directly transmit it to the third node as described in step 303 when there is a straight and horizontal interface (such as X2, Xn or other inter-base station interfaces) between the source SN and the SN where the failure occurs. The handover report message may also include one or a combination of the following information:

SCG failure information;

Type of SN change failure, which may be SN change too late, or SN change too early, or SN change to wrong cell;

Identity allocated for the UE by the SN where a SCG radio connection failure occurs. The identity may be the identity, S-NG-RAN node UE XnAP ID in the Xn message, or the identity, SgNB UE X2AP ID in the X2 message, and may also be C-RNTI;

Identity allocated for the UE by the source SN in the SN change procedure. The identity may also be C-RNTI;

Identity allocated for the UE by the MN. The identity may be the identity, M-NG-RAN node UE XnAP ID in the Xn message, or the identity, MeNB UE X2AP ID in the X2 message, and may also be C-RNTI;

Type of SCG radio connection failure, which may be a SN change failure or a radio link failure;

Cell identity of the PSCell of the source SN of the SN change, optionally, which may also include the TAC and PLMN identity, or the TAI to which the cell belongs;

Cell identity of the PSCell of a SN where a SCG radio connection failure occurs, optionally, which may also include the TAC and PLMN identity, or the TAI to which the cell belongs;

Cell identity of a cell of a SN suitable for access after the radio connection failure, optionally, which may also include the TAC and PLMN identity, or the TAI to which the cell belongs;

Time interval between the last SN change procedure and the SCG radio connection failure;

Information list of the SNs connected by the UE, or UE History Information including the information list of the SNs connected by the UE; and Mobility Information.

The node that receives the handover report may determine the type of SN change failure according to the received information and/or saved information such as the information list of the SNs connected by the UE, and optimize the parameters used for generating a SN change decision so as to reduce or avoid the reoccurrence of similar errors. The node receiving the handover report may be the first node or the third node.

Figure 5:
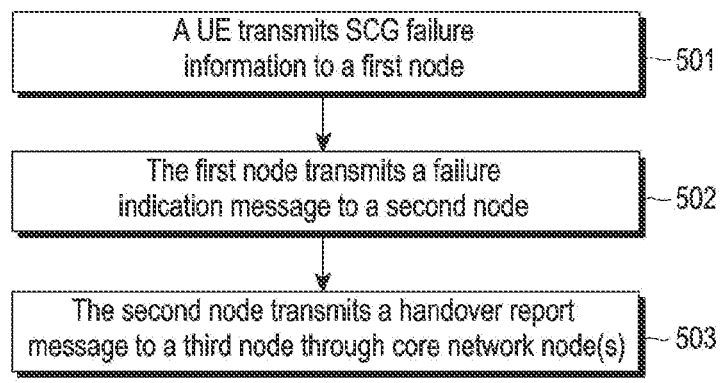
FIG. 5 is a flowchart showing a self-optimization method according to an exemplary embodiment of the present disclosure.

FIG. 5 is a flowchart showing a self-optimization method according to an exemplary embodiment of the present disclosure. As shown in the figure, a first node may be a MN, a second node may be a SN where a SCG radio connection failure occurs, and a third node may be a source SN of the last SN change before the failure. In this embodiment, the SN where the failure occurs transmits a handover report to the source SN through the core network. A detailed description of some steps that may obscure the subject of the present disclosure is omitted here. The method includes steps:

Step 501 to step 502 are similar to step 301 to step 302, and will not be repeated here.

Step 503: the method for the second node to determine the failure type is similar to that in step 303, and will not be repeated here. The processing for SN change too late is also similar to that described in step 303.

For SN change too late, SN change too early, or SN change to wrong cell triggered by the MN, the second node transmits a handover report to the first node, and the details are similar to those in step 303, and will not be repeated here.

For the last SN change triggered by the SN, if there is a horizontal interface (such as X2, Xn or other inter-base station interfaces) between the source SN and the SN where the failure occurs, the SN where the failure occurs will directly transmit a handover report to the source SN, and the specific method is as described in step 303. In a case that there is no horizontal interface (such as X2, Xn or other inter-base station interfaces) between the source SN and the SN where the failure occurs, the SN where the failure occurs transmits an uplink radio access network (RAN) configuration transfer message to the core network entity. The message includes SN change too early or SN change to wrong cell, and the message also includes a cell identity of the PSCell where the UE failed at the second node, a cell identity of the PSCell of the source SN, and/or a cell identity of a cell of the SN suitable for the UE to access. The message also includes the TAC and PLMN identity of where the cell, PSCell, where the UE failed at the second node is located, or the TAI of where the cell, PSCell, where the UE failed at the second node is located, and the TAC and PLMN identity of where the cell, PSCell, of the source SN is located, or the TAI of where the cell, PSCell, of the source SN is located, and the TAC and PLMN identity, or the TAI are used for routing in the core network, for example, the core network entity connected to the SN where the failure occurs finds the core network entity connected to the source SN. The core network entity transmits a downlink RAN configuration transfer message to the source SN. The message includes the wrong SN change, and the message includes a cell identity of the PSCell where the UE failed at the second node, a cell identity of the PSCell of the source SN, and/or a cell identity of the last cell of the SN suitable for the UE to access.

The uplink RAN configuration transfer message and the downlink RAN configuration transfer message may also include one or a combination of the following information:

SCG failure information;

Node information of the SN;

The node information includes one or a combination of the following information:

Node ID of the node, optionally, including the TAC and PLMN identity, or the TAI to which the node belongs;

Cell identity of the PSCell of the SN, optionally, including the TAC and PLMN identity, or the TAI to which the cell belongs;

Type of SN change failure, which may be SN change too late, or SN change too early, or SN change to wrong cell;

Identity allocated for the UE by the SN where a SCG radio connection failure occurs. The identity may be the identity, S-NG-RAN node UE XnAP ID in the Xn message, or the identity, SgNB UE X2AP ID in the X2 message, and may also be C-RNTI;

Identity allocated for the UE by the source SN in the SN change procedure. The identity may also be C-RNTI;

Identity allocated for the UE by the MN. The identity may be the identity, M-NG-RAN node UE XnAP ID in the Xn message, or the identity, MeNB UE X2AP ID in the X2 message, and may also be C-RNTI;

Type of SCG radio connection failure, which may be a SN change failure or a radio link failure;

Cell identity of the PSCell of the source SN of the SN change, optionally, which may also include the TAC and PLMN identity, or the TAI to which the cell belongs;

Cell identity of the PSCell of a SN where a SCG radio connection failure occurs, optionally, which may also include the TAC and PLMN identity, or the TAI to which the cell belongs;

Cell identity of a cell of a SN suitable for access after the radio connection failure, optionally, which may also include the TAC and PLMN identity, or the TAI to which the cell belongs; and Time interval between the last SN change procedure and the SCG radio connection failure;

Information list of the SNs connected by the UE, or UE History Information including the information list of the SNs connected by the UE; and Mobility Information.

The node that receives the handover report or the node that receives the downlink RAN configuration transfer message may determine the type of SN change failure according to the received information and/or saved information such as the information list of the SNs connected by the UE, and optimize the parameters used for generating a SN change decision so as to reduce or avoid the reoccurrence of similar errors. The node receiving the handover report may be the first node or the third node.

Figure 6:
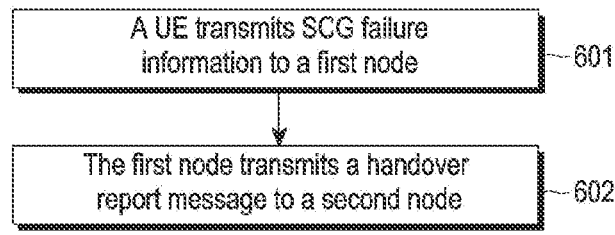
FIG. 6 is a flowchart showing a self-optimization method according to an exemplary embodiment of the present disclosure.

FIG. 6 is a flowchart showing a self-optimization method according to an exemplary embodiment of the present disclosure. As shown in the figure, a first node may be a MN, and a second node may be a SN that triggered a SN change before a failure occurred. A detailed description of some steps that may obscure the subject of the present disclosure is omitted here. The method includes steps:

Step 601 is similar to step 301 and will not be repeated here.

Step 602: The first node determines the cause of the failure, and the cause of the failure includes SN change too late, SN change too early, or SN change to wrong cell.

According to the information received in step 601 or the UE context information saved by the first node, if the UE resides in the cell of the second node for a long time (no SN change has occurred recently), and there is a cell suitable for the UE to access at another SN for the UE when the failure occurs, it is SN change too late. The cell suitable for the UE to access at the other SN may be transmitted by the UE to the first node, or determined by the first node based on the measurement report of the UE, or may be a cell at another SN configured for the UE decided by the first node. The first node knows whether there is a recent SN change according to the time interval between the last SN change procedure and the SCG radio connection failure or according to the time difference between last transmission of the UE context release to the source SN and failure indication.

For SN change too late, the first node may know that it or the SN where the failure occurs should trigger a SN change procedure, but none of them do this, which causes the UE to fail on the SN, so the second node and the first node are both nodes that cause problems. The first node may be appropriately self-optimized. The first node transmits a handover report message to the second node. The handover report may also be a SCG handover report or other message, the message includes SN change too late, and the message includes the cell identity of the PSCell where the UE failed at the second node.

According to the information received by the first node from the UE in the step or the UE context information saved by the first node, if the SN change has occurred recently for the UE, the SN where the source cell of the SN change is located is the SN suitable for the UE to access after the failure, or the source cell of the SN change is a cell of the SN suitable for the UE to access after the failure, then it is SN change too early. The first node knows whether there is a recent SN change according to the time interval between the last SN change procedure and the SCG radio connection failure or according to the time difference between last transmission of the UE context release to the source SN and failure indication. The first node receives the source cell identity of the last SN change in step 601 or knows the source cell identity of the last SN change according to the saved UE context. The cell suitable for the UE to access after the failure may be transmitted by the UE to the first node, or determined by the first node based on the measurement report of the UE, or may be a cell at another SN configured for the UE decided by the first node.

For SN change too early, if the SN change before the failure is initiated by the MN, the first node may be appropriately self-optimized. The first node knows whether the SN change before the failure was initiated by MN or SN, according to the saved UE context information. If the SN change before the failure is initiated by the SN, the first node transmits a handover report message to the second node. The handover report may also be a SCG handover report or other message, and the message includes SN change too early, and the message includes a cell identity of the PSCell of the SN where the SCG radio connection failure occurs and/or a cell identity of the PSCell of the source SN.

According to the information received by the first node from the UE in the step or the UE context information saved by the first node, if the SN change has occurred recently for the UE, the cell of the SN suitable for the UE to access after the failure is neither a cell of the source SN of the last SN change nor a cell of the SN where the failure occurs or a cell of the target SN of the SN change, it is SN change to wrong cell. The first node knows whether there is a recent SN change according to the time interval between the last SN change procedure and the SCG radio connection failure or according to the time difference between last transmission of the UE context release to the source SN and failure indication. The first node receives the source cell identity of the last SN change in step 601 or knows the source cell identity of the last SN change according to the saved UE context. The cell suitable for the UE to access after the failure may be transmitted by the UE to the first node, or determined by the first node based on the measurement report of the UE, or may be a cell at another SN configured for the UE decided by the first node.

For SN change to wrong cell, if the SN change before the failure is initiated by the MN, the first node may be appropriately self-optimized. The first node knows whether the SN change before the failure was initiated by MN or SN, according to the saved UE context information. If the SN change before the failure is initiated by the SN, the first node transmits a handover report message to the second node, i.e., the source SN. The handover report may also be a SCG handover report or other message, and the message includes SN change to wrong cell, and the message includes a cell identity of the PSCell of the SN where the SCG radio connection failure occurs, a cell identity of the PSCell of the source SN, and/or a cell identity of a cell of the SN suitable for the UE to access.

The node receiving the handover report may determine the type of SN change failure according to the received information and/or saved information such as the information list of the SNs connected by the UE, and optimize the parameters used for generating a SN change decision so as to reduce or avoid the recurrence of similar errors. The node receiving the handover report may be the first node or the third node.

Figure 7:
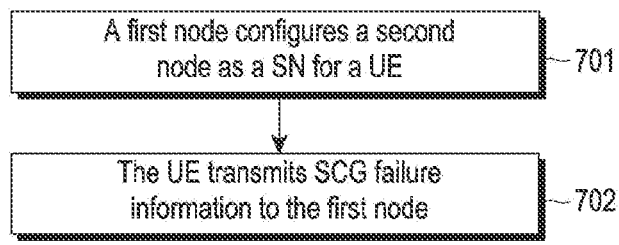
FIG. 7 is a flowchart showing a self-optimization method according to an exemplary embodiment of the present disclosure.

FIG. 7 is a flowchart showing a self-optimization method according to an exemplary embodiment of the present disclosure. As shown in the figure, a first node may be the MN, a third node may be a SN where a SCG radio connection failure occurs after the UE resides for a long time, or a source SN of a SN change procedure, and a second node may be a SN where the SCG radio connection failure occurs after the SN change completion, or a target SN during the SN change procedure. A detailed description of some steps that may obscure the subject of the present disclosure is omitted here. The method includes steps:

Step 701: The first node configures the third node as the SN of the UE.

In the process in which the first node configures the third node as the SN of the UE, the first node obtains PSCell information of where the UE is located, from the third node. The PSCell information includes a PSCell cell identity, and/or a PLMN identity and a TAC, or a TAI. The first node has two methods to obtain the PSCell information of where the UE is located, from the third node:

A first method: In the secondary node addition request message, the first node may request the third node to report the information of the PSCell selected by the third node all the time, for example, the first node always includes an information element, location information report at the secondary base station in the SN addition request message, the third node includes location information of the SN in a SN addition request acknowledge message according to the location information report at the secondary base station in the message after receiving the SN addition request message, and the location information on the SN may be a global cell identity and/or the TAC, or the TAI. The first node may actively trigger the third node to report the location information on the SN.

A second method: each time the third node transmits the SN addition request acknowledge message, the third node includes the location information on the SN in the message, and the location information on the SN may be a global cell identity. That is, even if the first node does not request the location information on the SN, the third node will report the location information of the UE on the SN.

The first node saves the received location information of the UE at the third node.

By means of the above method, the MN may know the location information of the UE on the SN for the subsequent self-configuration and self-optimization process all the time.

The first node may add the information of the third node to the saved information list of the SNs connected by the UE, as described above.

If there is a subsequent SN change procedure, for example, the SN change from the third node to the second node. Using the same method as above, the first node may know the location information of the UE at the second node all the time. The location information may be the PSCell information of where the UE is located. The PSCell information includes the PSCell cell identity, and/or the PLMN identity and the TAC, or the TAI. The first node saves the received location information of the UE at the second node.

The first node may add the information of the third node to the saved information list of the SNs connected by the UE that served the UE, with the most recent information at the top. The information about served UE includes a PSCell identity, a cell type, and a time period during the UE stays in the cell, as described above.

Step 702: The UE fails on the SN, and the UE transmits secondary cell group (SCG) failure information to the first node.

The first node determines the cause of the failure, and the specific method is similar to that in step 602. According to the received SCG failure report and step 701, the first node already knows information of the SN connected by the UE when the UE failed, information of the source SN that triggered the last handover, and information of the cell of the SN suitable for the UE to access after the failure, and thereby the first node may detect the cause of the failure.

If it is detected that SN handover too late, SN handover too early or SN handover to wrong cell occurs for the UE at the third node, the first node transmits a handover report to the third node, the content included in the message and the behavior of the third node are similar to those described in step 602, and will not be repeated here.

The following process takes the third embodiment as an example, in which the information required to determine the type of SN change failure is obtained by saving it as UE context information maintained in network.

The first node transmits a failure indication message to the second node. The failure indication message may also be a secondary cell group (SCG) failure indication or other message for transmitting the SCG failure information to the second node. The second node may be the SN where the SCG radio connection failure occurs. The first node knows the SN where the SCG radio connection failure occurs according to the information in the saved UE context.

The message includes an information report of SCG failure received from the UE. The message includes information about whether the MN or the SN triggered the last SN change procedure.

The message may also include one or a combination of the following information:

SCG failure information;

Information of the source SN in the last SN change procedure, including a cell identity of the PSCell, optionally, which may also include the TAC and PLMN identity, or the TAI to which the cell belongs;

Information of a SN where a SCG radio connection failure occurs, including a cell identity of the PSCell, optionally, which may also include the TAC and PLMN identity, or the TAI to which the cell belongs;

Cell identity of a cell of the SN suitable to be configured for the UE after the SCG radio connection failure, optionally, which may also include the TAC and PLMN identity, or the TAI to which the cell belongs;

Time interval between the last SN change procedure and the SCG radio connection failure;

Identity allocated for the UE by the SN where the SCG radio connection failure occurs. The identity may be the identity, S-NG-RAN node UE XnAP ID in the Xn message, or the identity, SgNB UE X2AP ID in the X2 message, and may also be C-RNTI;

C-RNTI allocated for the UE by the MN. The identity may be the identity, M-NG-RAN node UE XnAP ID in the Xn message, or the identity, MeNB UE X2AP ID in the X2 message, and may also be C-RNTI;

Type of SCG radio connection failure, which may be a SN change failure or a radio link failure;

Information list of the SNs connected by the UE, or UE History Information including the information list of the SNs connected by the UE; and Mobility Information.

The second node determines the cause for the failure, and the cause of the failure includes SN change too early, SN change too late, or SN change to the wrong cell.

According to the received information, if the UE resides in the cell of the second node for a long time (no SN change has occurred recently), and there is a suitable cell at another SN for the UE when the failure occurs, it is SN change too late. The cell suitable for the UE to access at the other SN may be transmitted by the UE to the first node and then transmitted by the first node to the second node, or determined by the second node based on the measurement report of the UE, or may be a cell at another SN configured for the UE decided by the first node, which is transmitted by the first node to the second node. The second node knows whether there is a recent SN change according to the time interval between the last SN change procedure and the SCG radio connection failure or according to the time difference between last receipt of RRC reconfiguration completion and failure indication.

For SN change too late, the second node may know that it or the MN should trigger a SN change procedure, but none of them do this, which causes the UE to fail on the SN, so the second node and the first node are both nodes that cause problems. The second node may be appropriately self-optimized. The second node transmits a handover report message to the first node. The handover report may also be a SCG handover report or other message, the message includes SN change too late, and the message includes the cell identity of the PSCell where the UE failed at the second node.

According to the received information, if the SN change has occurred recently for the UE, the SN where the source cell of the SN change is located is the SN suitable for the UE to access after the failure, or the source cell of the SN change is the cell of the SN suitable for the UE to access after the failure, then it is SN change too early. The second node knows whether there is a recent SN change according to the time interval between the last SN change procedure and the SCG radio connection failure or according to the time difference between last receipt of RRC reconfiguration completion and failure indication. The second node receives the source cell identity of the SN change from the first node. The cell suitable for the UE to access after the failure may be transmitted by the UE to the first node and then transmitted by the first node to the second node, or determined by the second node based on the measurement report of the UE, or may be a cell at another SN configured for the UE decided by the first node, which is transmitted by the first node to the second node.

For SN change too early, the second node transmits a handover report message to the first node for the last SN change triggered by the MN according to the information about whether the MN or the SN triggered the last SN change, received from the first node. The handover report may also be a SCG handover report or other message. The message includes SN change too early, and the message includes the cell identity of the PSCell where the UE failed at the second node. For the last SN change triggered by the SN, the second node transmits a handover report message to the third node, i.e., the source SN. The handover report may also be a SCG handover report or other message, and the message includes SN change too early, and the message includes the cell identity of the PSCell where the UE failed at the second node and/or the cell identity of the PSCell of the source SN.

According to the received information, if the SN change has occurred recently for the UE, and the cell of the SN suitable for the UE to access after the failure is neither a cell of the source SN of the last SN change nor a cell of the SN where the failure occurs or a cell of the target SN of the SN change, it is SN change to wrong cell. The second node knows whether there is a recent SN change according to the time interval between the last SN change procedure and the SCG radio connection failure or according to the time difference between last receipt of RRC reconfiguration completion and failure indication. The second node receives the source cell identity of the SN change from the first node. The cell suitable for the UE to access after the failure may be transmitted by the UE to the first node and then transmitted by the first node to the second node, or determined by the second node based on the measurement report of the UE, or may be a cell at another SN configured for the UE decided by the first node, which is transmitted by the first node to the second node.

For SN change to wrong cell, the second node transmits a handover report message to the first node for the last SN change triggered by the MN according to the information about whether the MN or the SN triggered the last SN change, received from the first node. The handover report may also be a SCG handover report or other message. The message includes SN change to wrong cell, and the message includes a cell identity of the PSCell where the UE failed at the second node, a cell identity of the PSCell of the source SN, and/or a cell identity of the PSCell on the SN suitable for the UE to access. For the last SN change triggered by the SN, the second node transmits a handover report message to the third node, i.e., the source SN. The handover report may also be a SCG handover report or other message, and the message includes SN change to wrong cell, and the message includes the cell identity of the PSCell where the UE failed at the second node, the cell identity of the PSCell of the source SN, and/or the cell identity of the PSCell on the SN suitable for the UE to access.

The message may also include one or a combination of the following information:

SCG failure information;

Type of SN change failure, which may be SN change too late, or SN change too early, or SN change to wrong cell;

Identity allocated for the UE by the SN where a SCG radio connection failure occurs. The identity may be the identity, S-NG-RAN node UE XnAP ID in the Xn message, or the identity, SgNB UE X2AP ID in the X2 message, and may also be C-RNTI;

Identity allocated for the UE by the MN. The identity may be the identity, M-NG-RAN node UE XnAP ID in the Xn message, or the identity, MeNB UE X2AP ID in the X2 message, and may also be C-RNTI;

Type of SCG radio connection failure, which may be a SN change failure or a radio link failure;

Cell identity of the PSCell of a source SN of the SN change, optionally, which may include the TAC and PLMN identity, or the TAI to which the cell belongs;

Cell identity of the PSCell of a SN where a SCG radio connection failure occurs, optionally, which may also include the TAC and PLMN identity, or the TAI to which the cell belongs;

Cell identity of a cell of a SN suitable for access after the SCG radio connection failure, optionally, which may include the TAC and PLMN identity, or the TAI to which the cell belongs;

Time interval between the last SN change procedure and the SCG radio connection failure; and Information list of the SNs connected by the UE, or UE History Information including the information list of the SNs connected by the UE; and Mobility Information.

The node receiving the handover report may determine the type of SN change failure according to the received information and/or saved information such as the information list of the SNs connected by the UE, and optimize the parameters used for generating a SN change decision so as to reduce or avoid the recurrence of similar errors. The node receiving the handover report may be the first node or the third node.

Figure 8:
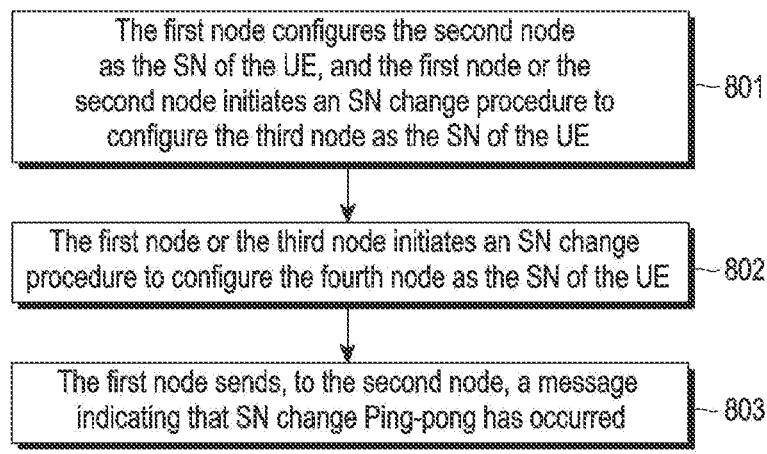
FIG. 8 is a flowchart showing a self-optimization method according to an exemplary embodiment of the present disclosure.

FIG. 8 is a flowchart illustrating a self-optimization method according to an example embodiment of the present disclosure. As shown in FIG. 8, the first node may be an MN, the second node may be an SN to which the PSCell connected by the UE belongs, the third node may be an SN to which another PSCell connected by the UE belongs, and the fourth node may be an SN to which still another PSCell connected by the UE belongs. The second node, the third node, and the fourth node may all be the same, or two of the nodes may be the same or different from each other. A detailed description of some steps that may obscure the subject of the present invention is omitted here. The method includes steps:

Step 801: The first node configures the second node as the SN of the UE, and the first node or the second node initiates an SN change procedure to configure the third node as the SN of the UE.

In the period during which the UE connects to the second node, the PSCell may be changed from one cell of the second node to another cell of the second node.

When the third node is configured as the SN of the UE, the PSCell of the UE is changed from a cell of the second node to a cell of the third node.

The second node may use the message between the second node and the first node to send, to the first node, the list of information of the PSCell connected by the UE generated by the second node. The list may include information of one or more PSCells connected by the UE. The information may include at least one of the following: the identification information of the SN to which the PSCell belongs, the duration of the UE connecting to the PSCell, the reason for the PSCell being changed, and the associated MN identification information. The identification information of the SN may include a PSCell ID, and optionally, may also include the TAC and PLMN identity, or the TAI of the Cell, and/or the node ID of the SN. The MN identification information may be the PCell ID, and optionally, may also include the TAC and PLMN identity, or the TAI of the Cell, and/or the node ID of the MN.

The message between the second node and the first node may be an Xn message or an X2 message. The Xn message may be S-Node Modification Request Acknowledge, or S-Node Modification Required, or S-Node Change Required, or S-Node Release Request Acknowledge, or S-Node Release Required, or Access and Mobility Indication, or a newly defined XN message. The X2 message may be SgNB Modification Request Acknowledge, or SgNB Modification Required, or SgNB Change Required, or SgNB Release Request Acknowledge, or SgNB Release Required, or SeNB Modification Request Acknowledge, or SeNB Modification Required, or SeNB Change Required, or SeNB Release Request Acknowledge, or SeNB Release Required, or Handover Report, or RLF Indication, or a newly defined X2 message.

The first node may determine whether the PSCell change is initiated by the first node or the second node according to the signaling process that occurs when the PSCell is changed. The first node also saves the result of the determination.

Step 802: The first node or the third node initiates an SN change procedure to configure the fourth node as the SN of the UE.

In the period during which the UE connects to the third node, the PSCell can be changed from one cell of the third node to another cell of the third node.

When the fourth node is configured as the SN of the UE, the PSCell of the UE is changed from one Cell of the third node to one Cell of the fourth node.

In the period during which the UE connects to the fourth node, the PSCell may be changed from one cell of the fourth node to another cell of the fourth node.

The third node may use the message between the third node and the first node to send, to the first node, the list of the information of the PSCell connected by the UE generated by the third node.

The fourth node may use the message between the fourth node and the first node send, to the first node, the list of the information of the PSCell connected by the UE generated by the fourth node.

The list may include information of one or more PSCells connected by the UE. The information may include at least one of the following: the identification information of the SN to which the PSCell belongs, the duration of the UE connecting to the PSCell, the reason for the PSCell being changed, and the associated MN identification information. The identification information of the SN may include a PSCell ID, and optionally, may also include the TAC and PLMN identity, or the TAI of the Cell, and/or the node ID of the SN. The MN identification information may be the PCell ID, and optionally, may also include the TAC and PLMN identity, or the TAI of the Cell, and/or the node ID of the MN.

The message between the third node and the first node and the message between the fourth node and the first node may be an Xn message or an X2 message. For the Xn message or X2 message, refer to the description in step 801.

The first node may determine whether the PSCell change is initiated by the first node or the third node according to the signaling process that occurs when the PSCell is changed. The first node also saves the result of the determination.

Step 803: The first node sends, to the second node, a message indicating that SN change Ping-pong has occurred.

The first node determines that SN Change Ping-pong has occurred according to the received list of the information of the PSCell connected by the UE. At the same time, the first node determines whether the SN change procedure from the second node to the third node is initiated by the first node or the second node, according to the saved information.

If it is initiated by the second node, the first node sends, to the second node, the determination that SN change Ping-pong occurs, and/or the received list of the information of the PSCell connected by the UE, using the message between the second node and the first node. If it is initiated by the first node, the first node may optimize the parameters used for generating a SN change decision so as to reduce or avoid the reoccurrence of similar errors.

The message between the second node and the first node may be an Xn message or an X2 message. The Xn message may be Handover Report, or Access and Mobility Indication, or a newly defined Xn message. The X2 message may be Handover Report, or RLF Indication, or a newly defined X2 message.

The second node may optimize the parameters used for generating a SN change decision according to the received information so as to reduce or avoid the reoccurrence of similar errors.

Figure 9:
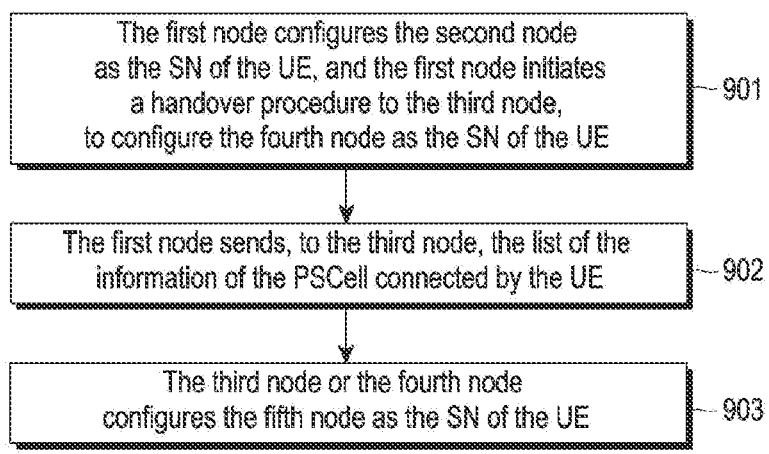
FIG. 9 is a flowchart showing a self-optimization method according to an exemplary embodiment of the present disclosure.

FIG. 9 is a flowchart illustrating a self-optimization method according to an example embodiment of the present disclosure. As shown in FIG. 9, the first node may be an MN1, the second node may be an SN2, the third node may be an MN2, the fourth node may be an SN3, and the fifth node may be an SN4. The second node, the fourth node, and the fifth node may all be the same, or two of the nodes may be the same or different from each other. A detailed description of some steps that may obscure the subject of the present invention is omitted here. The method includes steps:

Step 901: The first node configures the second node as the SN of the UE, and the first node initiates a handover procedure to the third node, during the handover procedure, the fourth node is configured as the SN of the UE, and the second node is released.

The second node may use the message between the second node and the first node to send, to the first node, the list of the information of the PSCell connected by the UE generated by the second node. The list may include information of one or more PSCells connected by the UE. The information may include at least one of the following: the identification information of the SN to which the PSCell belongs, the duration of the UE connecting to the PSCell, the reason for the PSCell being changed, and the associated MN identification information. The identification information of the SN may include a PSCell ID, and optionally, may also include the TAC and PLMN identity, or the TAI of the Cell, and/or the node ID of the SN. The MN identification information may be the PCell ID, and optionally, may also include the TAC and PLMN identity, or the TAI of the Cell, and/or the node ID of the MN.

The message between the second node and the first node may be an Xn message or an X2 message. The Xn message may be S-Node Modification Request Acknowledge, or S-Node Modification Required, or S-Node Change Required, or S-Node Release Request Acknowledge, or S-Node Release Required, or a newly defined Xn message. The X2 message may be SgNB Modification Request Acknowledge, or SgNB Modification Required, or SgNB Change Required, or SgNB Release Request Acknowledge, or SgNB Release Required, or SeNB Modification Request Acknowledge, or SeNB Modification Required, or SeNB Change Required, or SeNB Release Request Acknowledge, or SeNB Release Required, or a newly defined X2 message.

Step 902: The first node may use the message between the third node and the first node to send, to the third node, the list of the information of the PSCell connected by the UE received by the first node. The first node may also use the Ng message or the S1 message to send, to the third node, the list of the information of the PSCell connected by the UE received by the first node in a manner of forwarding by the core network node.

The message between the third node and the first node may be an Xn message or an X2 message. The Xn message may be Access and Mobility Indication, or Handover Request, or SN Status Transfer, or a newly defined Xn message. The X2 message may be Handover Request, or SN Status Transfer, or a newly defined X2 message.

The Ng message may be Uplink RAN Configuration Transfer, or Downlink RAN Configuration Transfer, or a newly defined Ng message. The S1 message may be an eNB Configuration Transfer, or MME Configuration Transfer, or eNB Direct Information Transfer, or MME Direct Information Transfer, or a newly defined S1 message.

The first node may also send, to the third node, the list of the information of the PSCell connected by the UE during the handover procedure in step 901. For example, an Xn message Handover Request or an X2 message Handover Request is used, and the Xn message or X2 message carries the list of the information of the PSCell connected by the UE.

The first node may also use the Ng message or the S1 message to send, to the third node, the list of the information of the PSCell connected by the UE in a manner of forwarding by the core network node during the handover procedure in step 901. For example, Ng messages Handover Required and Handover Request, or S1 messages Handover Required and Handover Request are used, and the Ng message or S1 message carries the list of the information of the PSCell connected by the UE.

Step 903: The third node or the fourth node initiates an SN change procedure to configure the fifth node as the SN of the UE.

The fourth node may use the message between the fourth node and the third node to send, to the first node, the list of the information of the PSCell connected by the UE generated by the fourth node.

The message between the fourth node and the third node may be an Xn message or an X2 message. For the Xn message or X2 message, refer to the description in step 901.

The third node determines that SN change Ping-pong has occurred according to the received list of the information of the PSCell connected by the UE. Since the process of configuring the fourth node as the SN of the UE in step 901 is initiated by the third node, the third node may optimize the parameters used for generating a SN change decision according to the received information so as to reduce or avoid the reoccurrence of similar errors.

Figure 10:
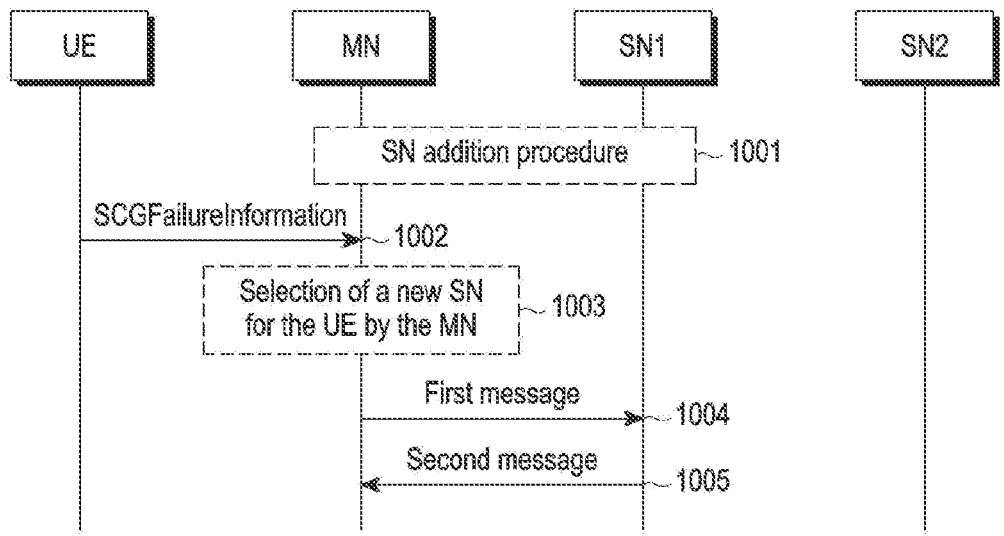
FIG. 10 schematically shows a first embodiment according to the present disclosure.

FIG. 10 schematically shows a first embodiment according to the present disclosure.

In this embodiment, whether to initiate a SN change procedure is decided by the MN. Each of the MN, a SN1 and a SN2 is a gNB. A detailed description of some steps that may obscure the subject of the present disclosure is omitted here.

Step 1001: The MN configures SN1 as the SN of the UE.

Step 1002: Because the quality of the radio signal of the SN1 changes, and the MN does not initiate a SN change procedure from the SN1 to other SNs in time, a SCG radio connection failure occurs for the UE on the SN1. The UE transmits a NR RRC message, SCGFailureInformation, to the MN. The message includes one or a combination of the following information:

Information of the SN (i.e., the SN1) where a SCG radio connection failure occurs;

Information of the source SN in the last SN change procedure;

Cell identity of a cell of the SN suitable for the UE to access after the SCG failure reported by the UE, optionally, which may also include the TAC and PLMN identity, or the TAI to which the cell belongs;

Type of SCG radio connection failure, which may be a radio link failure;

C-RNTI allocated for the UE by the SN where the SCG radio connection failure occurs;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 1003: The MN may select the SN2 as a SN suitable for the UE to access according to the cell of the SN suitable for access after the failure reported by the UE and/or the measurement report of the UE.

If the SCGFailureInformation message only carries the information of the SN where a SCG radio connection failure occurs, or the information of the source SN in the last SN change procedure is the same as the information of the SN where the SCG radio connection failure occurs, and the SN suitable for access is different from the SN where the SCG radio connection failure occurs and the type of SCG radio connection failure is the radio link failure, the MN may determine that the type of SN change failure is SN change too late.

Step 1004: The MN transmits a first message to the SN where the SCG radio connection failure occurs, i.e., the SN1. The first message may be a Xn message, Failure Indication, or a newly defined Xn message, SCG Failure Indication.

The message includes one or a combination of the following information:

SCG failure information;

Type of SN change failure, which may be SN change too late;

One flag indicating that this SN change procedure is decided by the MN;

Identity allocated for the UE by the SN where a SCG radio connection failure occurs. The identity may be the identity, S-NG-RAN node UE XnAP ID in the Xn message, and may also be C-RNTI;

Identity allocated for the UE by the MN. The identity may be the identity, M-NG-RAN node UE XnAP ID in the Xn message, and may also be C-RNTI;

Type of SCG radio connection failure, which may be a radio link failure;

Information of a source SN of the SN change;

Information of a SN where a SCG radio connection failure occurs; and

Information of a SN suitable for access after the radio connection failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN1 ignores the type of SN change failure transmitted by the MN, the SN1 may determine the type of SN change failure as SN change too late by itself by means of the method in step 1003 according to the received information.

Step 1005: The above message indicates that the SN change procedure is decided by the MN, and thus the SN1 transmits a second message to the MN. The second message may be a Xn message, Handover Report, or a newly defined Xn message, SCG Change Report.

The message includes one or a combination of the following information:

SCG failure information;

Type of SN change failure, which may be SN change too late;

Identity allocated for the UE by the MN in the last message;

Information of a source SN of the SN change;

Information of a SN where a SCG radio connection failure occurs;

Information of a SN suitable for access after the radio connection failure; and

Type of SCG radio connection failure, which may be a radio link failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or avoiding the similar errors.

Figure 11:
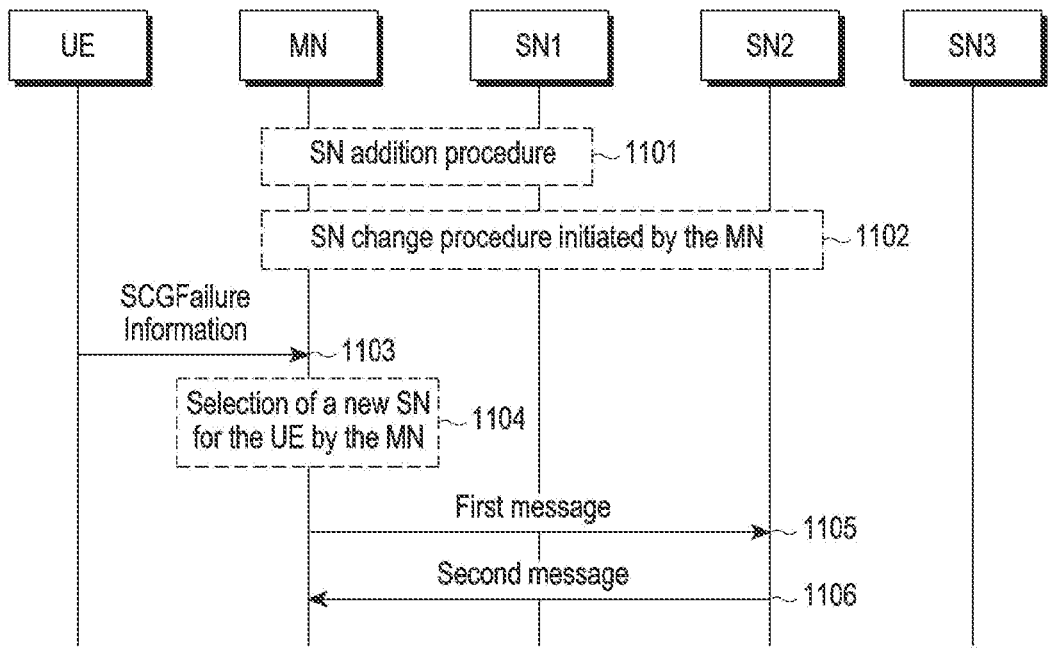
FIG. 11 schematically shows a second embodiment according to the present disclosure.

FIG. 11 schematically shows a second embodiment according to the present disclosure.

In this embodiment, whether to initiate a SN change procedure is decided by the MN. Each of the MN, a SN1, a SN2 and a SN3 is a gNB. A detailed description of some steps that may obscure the subject of the present disclosure is omitted here.

Step 1101: The MN configures the SN of the UE as SN1.

Step 1102: The MN initiates the SN change procedure from the SN1 to the SN2.

Step 1103: A SCG radio connection failure occurs for the UE on the SN2. The UE transmits a NR RRC message, SCGFailureInformation, to the MN. The message includes one or a combination of the following information:

Information of the SN (i.e., the SN2) where a SCG radio connection failure occurs;

Information of the source SN (i.e., the SN1) in the last SN change procedure;

Cell identity of a cell of the SN suitable for the UE to access after the SCG failure reported by the UE, optionally, which may also include the TAC and PLMN identity, or the TAI to which the cell belongs;

Time interval between the last SN change procedure and the SCG radio connection failure;

Type of SCG radio connection failure, which may be a SN change failure or a radio link failure;

C-RNTI allocated for the UE by the SN where the SCG radio connection failure occurs;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 1104: The MN may select SN3 as a SN suitable for the UE to access according to the cell of the SN suitable for access after the failure reported by the UE and/or the measurement report of the UE.

The SN3 may be the same as the SN1.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 1105: The MN transmits a first message to the SN where the SCG radio connection failure occurs, that is, the SN2. The first message may be a Xn message, Failure Indication, or a newly defined Xn message, SCG Failure Indication.

The message includes one or a combination of the following information:

SCG failure information;

Type of SN change failure, which may be SN change too early, or SN change to wrong cell;

One flag indicating that this SN change procedure is decided by the MN;

Identity allocated for the UE by the SN where a SCG radio connection failure occurs. The identity may be the identity, S-NG-RAN node UE XnAP ID in the Xn message, and may also be C-RNTI;

Identity allocated for the UE by the MN. The identity may be the identity, M-NG-RAN node UE XnAP ID in the Xn message, and may also be C-RNTI;

Type of SCG radio connection failure, which may be a SN change failure or a radio link failure;

Information of a source SN of the SN change;

Information of a SN where a SCG radio connection failure occurs;

Information of a SN suitable for access after the radio connection failure; and

Time interval between the last SN change procedure and the SCG radio connection failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN1 ignores the type of SN change failure transmitted by the MN, the SN1 may determine the type of SN change failure by itself by means of the method in step 1104 according to the received information.

Step 1106: The above message indicates that the SN change procedure is decided by the MN, and thus the SN2 transmits a second message to the MN. The second message may be a Xn message, Handover Report, or a newly defined Xn message, SCG Change Report.

The message includes one or a combination of the following information:

SCG failure information;

Type of SN change failure, which may be SN change too early, or SN change to wrong cell;

Identity allocated for the UE by the MN in the last message;

Information of the source SN of the SN change;

Information of a SN where a SCG radio connection failure occurs;

Information of a SN suitable for access after the radio connection failure;

Type of SCG radio connection failure, which may be a SN change failure or a radio link failure; and Time interval between the last SN change procedure and the SCG radio connection failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or even avoiding the similar errors.

Figure 12:
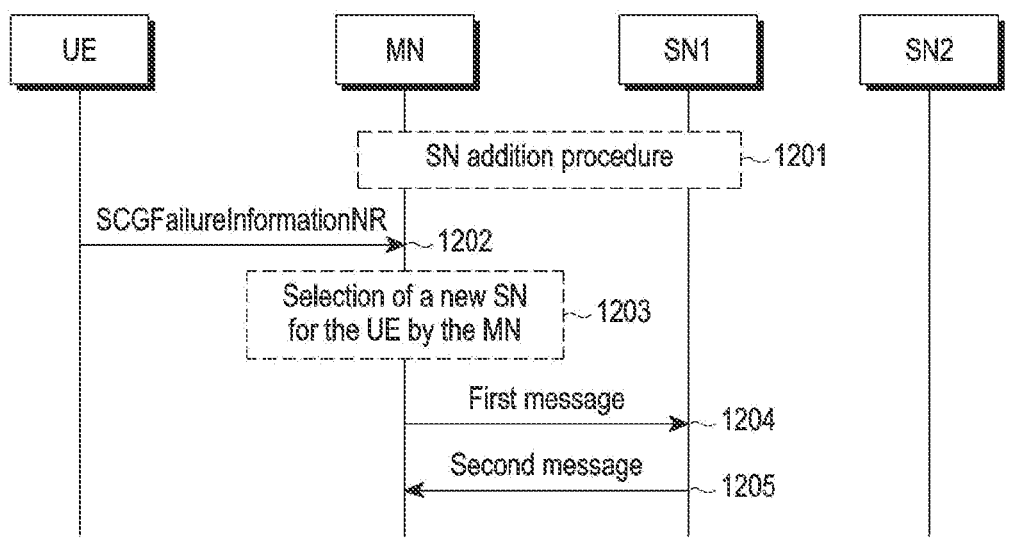
FIG. 12 schematically shows a third embodiment according to the present disclosure.

FIG. 12 schematically shows a third embodiment according to the present disclosure.

In this embodiment, whether to initiate a SN change procedure is decided by the MN. The MN is an eNB, and each of a SN1 and a SN2 is an en-gNB. A detailed description of some steps that may obscure the subject of the present disclosure is omitted here.

Step 1201: The MN configures the SN of the UE as SN1.

Step 1202: Because the quality of the radio signal of the SN1 changes, and the MN does not initiate a SN change procedure from the SN1 to other SNs in time, a SCG radio connection failure occurs for the UE on the SN1. The UE transmits an EUTRA RRC message, SCGFailureInformationNR, to the MN. The message includes one or a combination of the following information:

Information of the SN (i.e., the SN1) where a SCG radio connection failure occurs;

Information of the source SN in the last SN change procedure;

Cell identity of a cell of the SN suitable for the UE to access after the SCG failure reported by the UE, optionally, which may also include the TAC and PLMN identity, or the TAI to which the cell belongs;

Type of SCG radio connection failure, which may be a radio link failure;

C-RNTI allocated for the UE by the SN where the SCG radio connection failure occurs;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 1203: The MN may select the SN2 as a SN suitable for the UE to access according to the cell of the SN suitable for access after the failure reported by the UE and/or the measurement report of the UE.

If the SCGFailureInformationNR message only carries the information of the SN where a SCG radio connection failure occurs, or the information of the source SN in the last SN change procedure is the same as the information of the SN where the SCG radio connection failure occurs, and the SN suitable for access is different from the SN where the SCG radio connection failure occurs and the type of SCG radio connection failure is the radio link failure, the MN may determine that the type of SN change failure is SN change too late.

Step 1204: The MN transmits a first message to the SN where the SCG radio connection failure occurs, i.e., the SN1. The first message may be a X2 message, RLF Indication, or a newly defined X2 message, SCG Failure Indication.

The message includes one or a combination of the following information:

SCG failure information;

Type of SN change failure, which may be SN change too late;

One flag indicating that this SN change procedure is decided by the MN;

Identity allocated for the UE by the SN where a SCG radio connection failure occurs. The identity may be the identity, SgNB UE X2AP ID in the X2 message, and may also be C-RNTI;

Identity allocated for the UE by the MN. The identity may be the identity, MeNB UE X2AP ID in the X2 message, and may also be C-RNTI;

Type of SCG radio connection failure, which may be a radio link failure;

Information of a source SN of the SN change;

Information of a SN where a SCG radio connection failure occurs; and

Information of a SN suitable for access after the radio connection failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN1 ignores the type of SN change failure transmitted by the MN, the SN1 may determine the type of SN change failure as SN change too late by itself by means of the method in step 1203 according to the received information.

Step 1205: The above message indicates that the SN change procedure is decided by the MN, and thus the SN1 transmits a second message to the MN. The second message may be a X2 message, Handover Report, or a newly defined X2 message, SCG Change Report.

The message includes one or a combination of the following information:

SCG failure information;

Type of SN change failure, which may be SN change too late;

Identity allocated for the UE by the MN in the last message;

Information of a source SN of the SN change;

Information of a SN where a SCG radio connection failure occurs;

Information of a SN suitable for access after the radio connection failure; and

Type of SCG radio connection failure, which may be a radio link failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or avoiding the similar errors.

Figure 13:
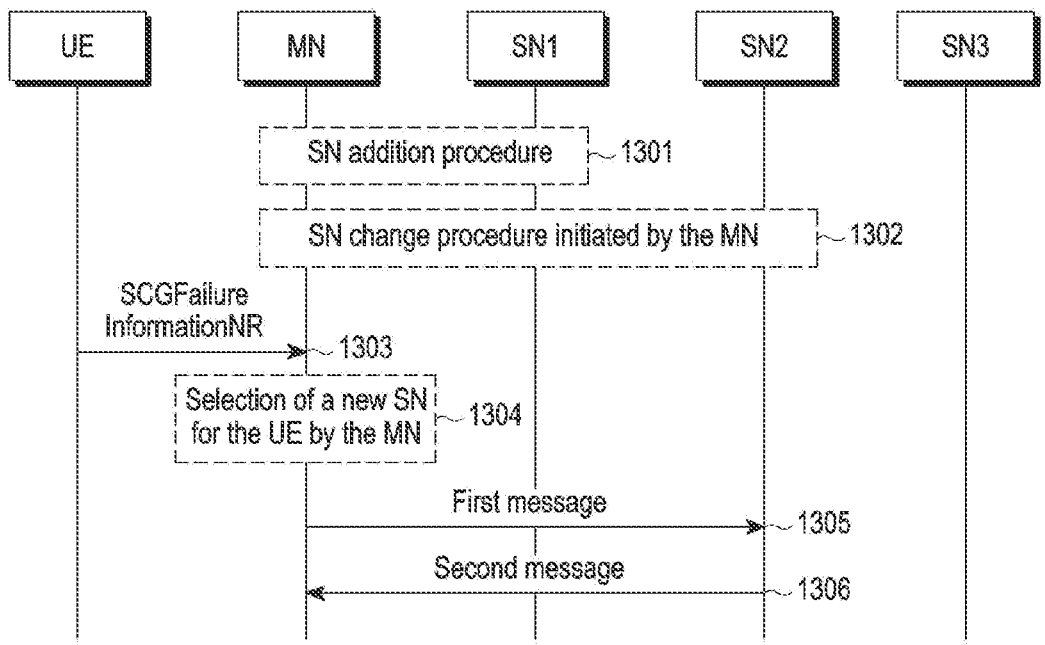
FIG. 13 schematically shows a fourth embodiment according to the present disclosure.

FIG. 13 schematically shows a fourth embodiment according to the present disclosure.

In this embodiment, whether to initiate a SN change procedure is decided by the MN. The MN is an eNB, and each of a SN1, a SN2 and a SN3 is an en-gNB. A detailed description of some steps that may obscure the subject of the present disclosure is omitted here.

Step 1301: The MN configures the SN of the UE as SN1.

Step 1302: The MN initiates the SN change procedure from the SN1 to the SN2.

Step 1303: A SCG radio connection failure occurs for the UE on the SN2. The UE transmits an EUTRA RRC message, SCGFailureInformationNR, to the MN. The message includes one or a combination of the following information:

Information of the SN (i.e., the SN2) where a SCG radio connection failure occurs;

Information of the source SN (i.e., the SN1) in the last SN change procedure;

Cell identity of a cell of the SN suitable for the UE to access after the SCG failure reported by the UE, optionally, which may also include the TAC and PLMN identity, or the TAI to which the cell belongs;

Time interval between the last SN change procedure and the SCG radio connection failure;

Type of SCG radio connection failure, which may be a SN change failure or a radio link failure;

C-RNTI allocated for the UE by the SN where the SCG radio connection failure occurs;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 1304: The MN may select SN3 as a SN suitable for the UE to access according to the cell of the SN suitable for access after the failure reported by the UE and/or the measurement report of the UE.

The SN3 may be the same as the SN1.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 1305: The MN transmits a first message to the SN where the SCG radio connection failure occurs, that is, the SN1. The first message may be a X2 message, RLF Indication, or a newly defined X2 message, SCG Failure Indication.

The message includes one or a combination of the following information:

SCG failure information;

Type of SN change failure, which may be SN change too early, or SN change to wrong cell;

One flag indicating that this SN change procedure is decided by the MN;

Identity allocated for the UE by the SN where a SCG radio connection failure occurs. The identity may be the identity, SgNB UE X2AP ID in the X2 message, and may also be C-RNTI;

Identity allocated for the UE by the MN. The identity may be the identity, MeNB UE X2AP ID in the X2 message, and may also be C-RNTI;

Type of SCG radio connection failure, which may be a SN change failure or a radio link failure;

Information of a source SN of the SN change;

Information of a SN where a SCG radio connection failure occurs;

Information of a SN suitable for access after the radio connection failure; and

Time interval between the last SN change procedure and the SCG radio connection failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN1 ignores the type of SN change failure transmitted by the MN, the SN1 may determine the type of SN change failure as SN change too late by itself by means of the method in step 1203 according to the received information.

Step 1306: The above message indicates that the SN change procedure is decided by the MN, and thus the SN1 transmits a second message to the MN. The second message may be a X2 message, Handover Report, or a newly defined X2 message, SCG Change Report.

The message includes one or a combination of the following information:

SCG failure information;

Type of SN change failure, which may be SN change too early, or SN change to wrong cell;

Identity allocated for the UE by the MN in the last message;

Information of the source SN of the SN change;

Information of a SN where a SCG radio connection failure occurs;

Information of a SN suitable for access after the radio connection failure;

Type of SCG radio connection failure, which may be a SN change failure or a radio link failure; and Time interval between the last SN change procedure and the SCG radio connection failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or even avoiding the similar errors.

Figure 14:
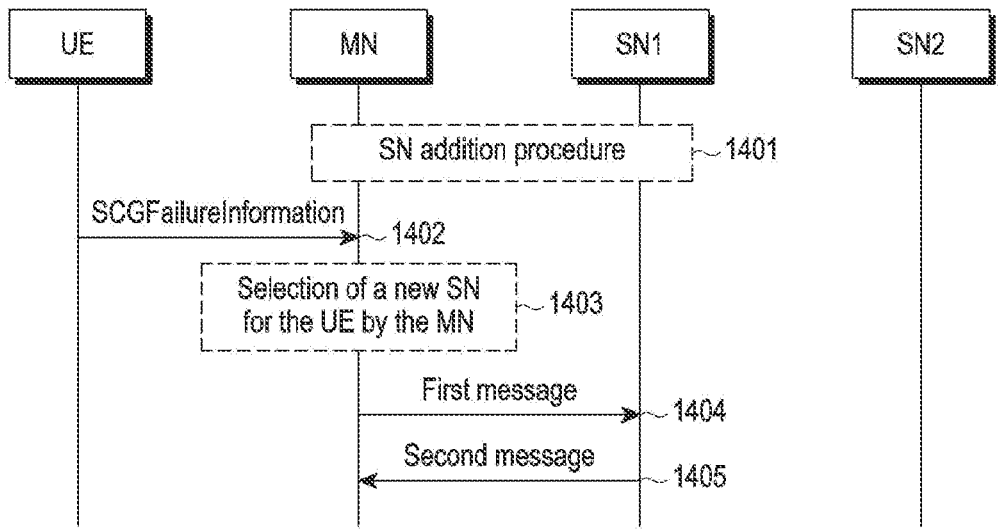
FIG. 14 schematically shows a fifth embodiment according to the present disclosure.

FIG. 14 schematically shows a fifth embodiment according to the present disclosure.

In this embodiment, whether to initiate a SN change procedure is decided by the MN. Each of the MN, a SN1 and a SN2 is a gNB. A detailed description of some steps that may obscure the subject of the present disclosure is omitted here.

Step 1401: The MN configures the SN of the UE as SN1. In a SN addition procedure of the Xn, the SN1 reports the PSCell ID and its PLMN to the MN. The MN may determine the Tracking Area Code of the cell according to the information exchanged between the MN and the SN1 in a Xn Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 1402: Because the quality of the radio signal of the SN1 changes, and the SN1 does not initiate a SN change procedure from the SN1 to other SNs in time, a SCG radio connection failure occurs for the UE on the SN1. The UE transmits a NR RRC message, SCGFailureInformation, to the MN. The measurement report of the UE is included therein.

Step 1403: The MN may select the SN2 as a SN suitable for the UE to access according to the measurement report of the UE. As described in step 1401, the MN adds the information of the SN2 to the information list of the SNs connected by the UE saved by the MN. Therefore, the MN may know the information of the SN suitable for access.

The MN knows that the SCG radio connection failure occurred on the last SN configured for the UE according to SCGFailureInformation, and may also know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of SN where the SCG radio connection failure occurs, the information of the SN should also be the information of the source SN of the SN change, and the SN suitable for access is different from the SN where the SCG radio connection failure occurs.

In addition, the MN does not initiate the SN change procedure, nor receives the signaling of the SN change procedure initiated by the SN, so the MN may determine that the type of SCG radio connection failure is a radio link failure.

Based on the above information, the MN may determine that the type of SN change failure is SN change too late.

Step 1404: The MN transmits a first message to the SN where the SCG radio connection failure occurs, i.e., the SN1. The first message may be a Xn message, Failure Indication, or a newly defined Xn message, SCG Failure Indication.

The message includes one or a combination of the following information:

SCG failure information;

Type of SN change failure, which may be SN change too late;

One flag indicating that this SN change procedure is decided by the MN;

Identity allocated for the UE by the SN where a SCG radio connection failure occurs. The identity may be the identity, S-NG-RAN node UE XnAP ID in the Xn message;

Identity allocated for the UE by the MN. The identity may be the identity, M-NG-RAN node UE XnAP ID in the Xn message, and may also be C-RNTI;

Type of SCG radio connection failure, which may be a radio link failure;

Information of a source SN of the SN change;

Information of a SN where a SCG radio connection failure occurs;

Information of a SN suitable for access after the radio connection failure; and

Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

The SN1 may also determine the information of the source SN of the SN change, and/or the information of the SN where the SCG radio connection failure occurs, and/or the information of the SN suitable for access after the radio connection failure by itself, according to the received information list of the SNs connected by the UE.

If the MN does not transmit the type of SN change failure, or the SN1 ignores the type of SN change failure transmitted by the MN, the SN1 may determine the type of SN change failure as SN change too late by itself by means of the method in step 1403 according to the received information.

The SN1 may determine the MN is different from the SN1 to which the MN is associated at present according to the associated MN identification information in the information of the SN1 in the received information list of the SNs connected by the UE, thereby avoiding the misoperation.

Step 1405: The above message indicates that the SN change procedure is decided by the MN, and thus the SN1 transmits a second message to the MN. The second message may be a Xn message, Handover Report, or a newly defined Xn message, SCG Change Report.

The message includes one or a combination of the following information:

SCG failure information;

Type of SN change failure, which may be SN change too late;

Identity allocated for the UE by the MN in the last message;

Information of a source SN of the SN change;

Information of a SN where a SCG radio connection failure occurs;

Information of a SN suitable for access after the radio connection failure;

Type of SCG radio connection failure, which may be a radio link failure; and

Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or avoiding the similar errors.

Figure 15:
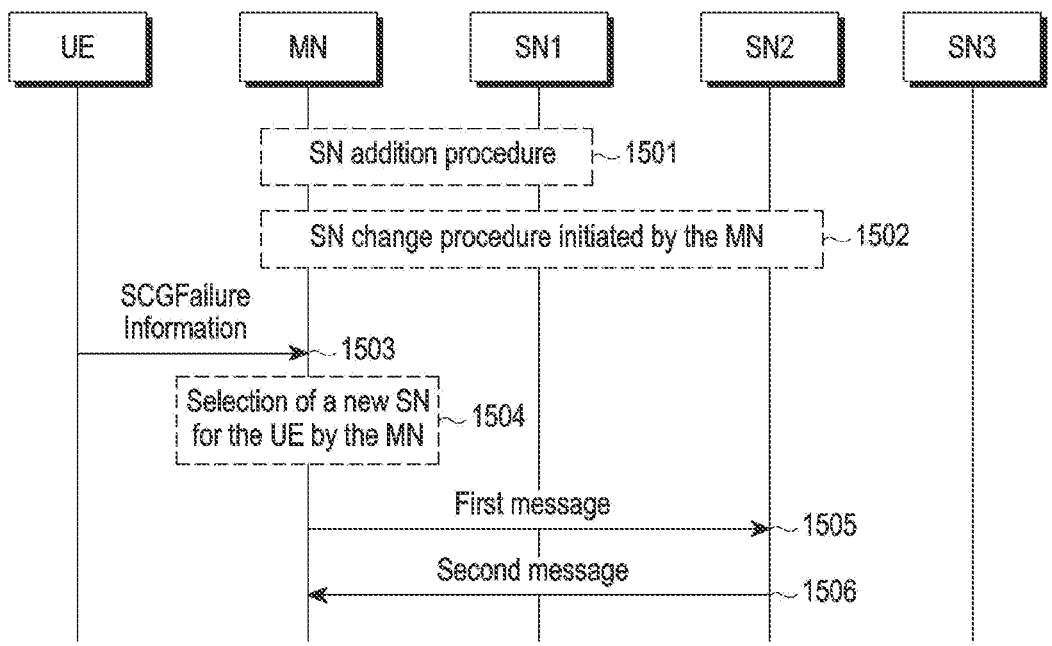
FIG. 15 schematically shows a sixth embodiment according to the present disclosure.

FIG. 15 schematically shows a sixth embodiment according to the present disclosure.

In this embodiment, whether to initiate a SN change procedure is decided by the MN. Each of the MN, a SN1, a SN2 and a SN3 is a gNB. A detailed description of some steps that may obscure the subject of the present disclosure is omitted here.

Step 1501: The MN configures the SN of the UE as SN1. In a SN addition procedure of the Xn, the SN1 reports the PSCell ID and its PLMN to the MN. The MN may determine the Tracking Area Code of the cell according to the information exchanged between the MN and the SN1 in a Xn Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 1502: The MN initiates the SN change procedure from the SN1 to the SN2. As described in step 1501, the MN adds the information of the SN2 to the information list of the SNs connected by the UE saved by the MN.

Step 1503: A SCG radio connection failure occurs for the UE on the SN2. The UE transmits a NR RRC message, SCGFailureInformation, to the MN. The measurement report of the UE is included therein.

Step 1504: The MN may select SN3 as a SN suitable for the UE to access according to the measurement report of the UE. As described in step 1401, the MN adds the information of SN3 to the information list of the SNs connected by the UE saved by the MN. Therefore, the MN may know the information of the SN suitable for access.

The SN3 may be the same as the SN1.

The MN knows that the SCG radio connection failure occurred on the last SN configured for the UE according to SCGFailureInformation, and may also know, from the saved information list of the SNs connected by the UE, that the SN is the SN2, and know Cell ID of the PSCell of the SN2, and the TAC and PLMN identity, or the TAI to which the Cell belongs. Therefore, the MN may know the information of SN where the SCG radio connection failure occurs. In addition, the MN initiates the SN change procedure, so the SN previously configured for the UE by SN2 is the source SN of the SN change. The MN may know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of the source SN of the SN change.

If the MN receives the SCG failure information reported by the UE when the SN change procedure is not successfully completed, the MN may determine that the type of SCG radio connection failure is the SN change failure, and if not, the type of SCG radio connection failure is the radio link failure.

The MN may also calculate the time interval between the last SN change procedure and the SCG radio connection failure according to the time of the last SN change procedure and the received SCG failure information transmitted by the UE.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 1505: The MN transmits a first message to the SN where the SCG radio connection failure occurs, that is, the SN1. The first message may be a Xn message, Failure Indication, or a newly defined Xn message, SCG Failure Indication.

The message includes one or a combination of the following information:

SCG failure information;

Type of SN change failure, which may be SN change too early, or SN change to wrong cell;

One flag indicating that this SN change procedure is decided by the MN;

Identity allocated for the UE by the SN where a SCG radio connection failure occurs. The identity may be the identity, S-NG-RAN node UE XnAP ID in the Xn message;

Identity allocated for the UE by the MN. The identity may be the identity, M-NG-RAN node UE XnAP ID in the Xn message, and may also be C-RNTI;

Type of SCG radio connection failure, which may be a SN change failure or a radio link failure;

Information of a source SN of the SN change;

Information of a SN where a SCG radio connection failure occurs;

Information of a SN suitable for access after the radio connection failure;

Time interval between the last SN change procedure and the SCG radio connection failure; and Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN1 ignores the type of SN change failure transmitted by the MN, the SN1 may determine the type of SN change failure by itself by means of the method in step 1504 according to the received information.

Step 1506: The above message indicates that the SN change procedure is decided by the MN, and thus the SN1 transmits a second message to the MN. The second message may be a Xn message, Handover Report, or a newly defined Xn message, SCG Change Report.

The message includes one or a combination of the following information:

SCG failure information;

Type of SN change failure, which may be SN change too early, or SN change to wrong cell;

Identity allocated for the UE by the MN in the last message;

Information of a source SN of the SN change;

Information of a SN where a SCG radio connection failure occurs;

Information of a SN suitable for access after the radio connection failure;

Type of SCG radio connection failure, which may be a SN change failure or a radio link failure;

Time interval between the last SN change procedure and the SCG radio connection failure; and Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or avoiding the similar errors.

Figure 16:
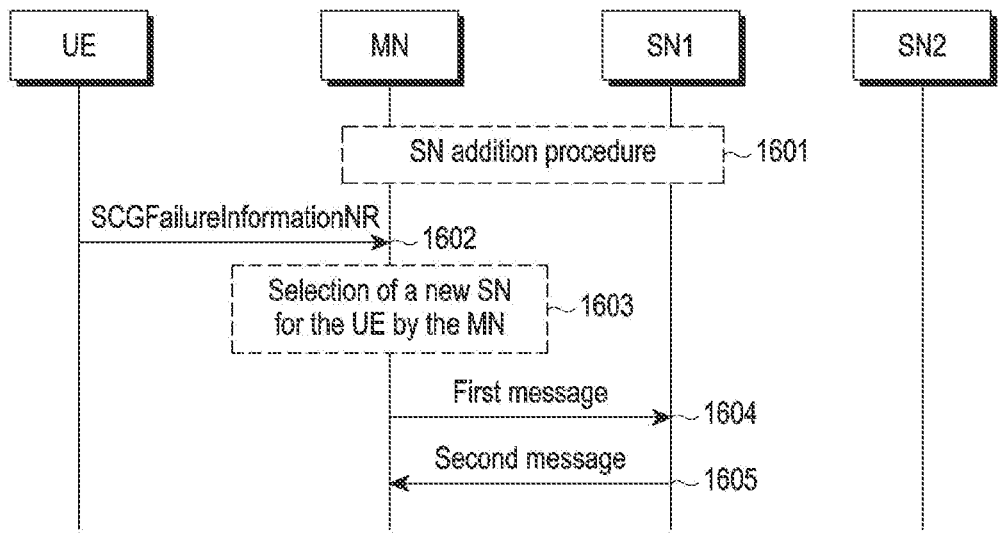
FIG. 16 schematically shows a seventh embodiment according to the present disclosure.

FIG. 16 schematically shows a seventh embodiment according to the present disclosure.

In this embodiment, whether to initiate a SN change procedure is decided by the MN. The MN is an eNB, and each of a SN1 and a SN2 is an en-gNB. A detailed description of some steps that may obscure the subject of the present disclosure is omitted here.

Step 1601: The MN configures the SN of the UE as SN1. In a SN addition procedure of the X2, the SN1 reports the PSCell ID to the MN, while the MN knows the PLMN used by the SCG. The MN may determine the Tracking Area Code of the cell according to the information exchanged between the MN and the SN1 in an EN-DC Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 1602: Because the quality of the radio signal of the SN1 changes, and the MN does not initiate a SN change procedure from the SN1 to other SNs in time, a SCG radio connection failure occurs for the UE on the SN1. The UE transmits an EUTRA RRC message, SCGFailureInformationNR, to the MN. The measurement report of the UE is included therein.

Step 1603: The MN may select SN2 as a SN suitable for the UE to access according to the measurement report of the UE. As described in step 1601, the MN adds the information of SN2 to the information list of the SNs connected by the UE saved by the MN. Therefore, the MN may know the information of the SN suitable for access.

The MN knows that the SCG radio connection failure occurred on the last SN configured for the UE according to SCGFailureInformationNR, and may also know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of SN where the SCG radio connection failure occurs, the information of the SN should also be the information of the source SN of the SN change, and the SN suitable for access is different from the SN where the SCG radio connection failure occurs.

In addition, the MN does not initiate the SN change procedure, nor receives the signaling of the SN change procedure initiated by the SN, so the MN may determine that the type of SCG radio connection failure is a radio link failure.

Based on the above information, the MN may determine that the type of SN change failure is SN change too late.

Step 1604: The MN transmits a first message to the SN where the SCG radio connection failure occurs, that is, the SN1. The first message may be a X2 message, RLF Indication, or a newly defined X2 message, SCG Failure Indication.

The message includes one or a combination of the following information:

SCG failure information;

Type of SN change failure, which may be SN change too late;

One flag indicating that this SN change procedure is decided by the MN;

Identity allocated for the UE by the SN where a SCG radio connection failure occurs. The identity may be the identity, SgNB UE X2AP ID in the X2 message;

Identity allocated for the UE by the MN. The identity may be the identity, MeNB UE X2AP ID in the X2 message, and may also be C-RNTI;

Type of SCG radio connection failure, which may be a radio link failure;

Information of a source SN of the SN change;

Information of a SN where a SCG radio connection failure occurs;

Information of a SN suitable for access after the radio connection failure; and

Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

The SN1 may also determine the information of the source SN of the SN change, and/or the information of the SN where the SCG radio connection failure occurs, and/or the information of the SN suitable for access after the radio connection failure by itself, according to the received information list of the SNs connected by the UE.

If the MN does not transmit the type of SN change failure, or the SN1 ignores the type of SN change failure transmitted by the MN, the SN1 may determine the type of SN change failure as SN change too late by itself by means of the method in step 1603 according to the received information.

Step 1605: The above message indicates that the SN change procedure is decided by the MN, and thus the SN1 transmits a second message to the MN. The second message may be a X2 message, Handover Report, or a newly defined X2 message, SCG Change Report.

The message includes one or a combination of the following information:

SCG failure information;

Type of SN change failure, which may be SN change too late;

Identity allocated for the UE by the MN in the last message;

Information of a source SN of the SN change;

Information of a SN where a SCG radio connection failure occurs;

Information of a SN suitable for access after the radio connection failure;

Type of SCG radio connection failure, which may be a radio link failure; and

Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or avoiding the similar errors.

Figure 17:
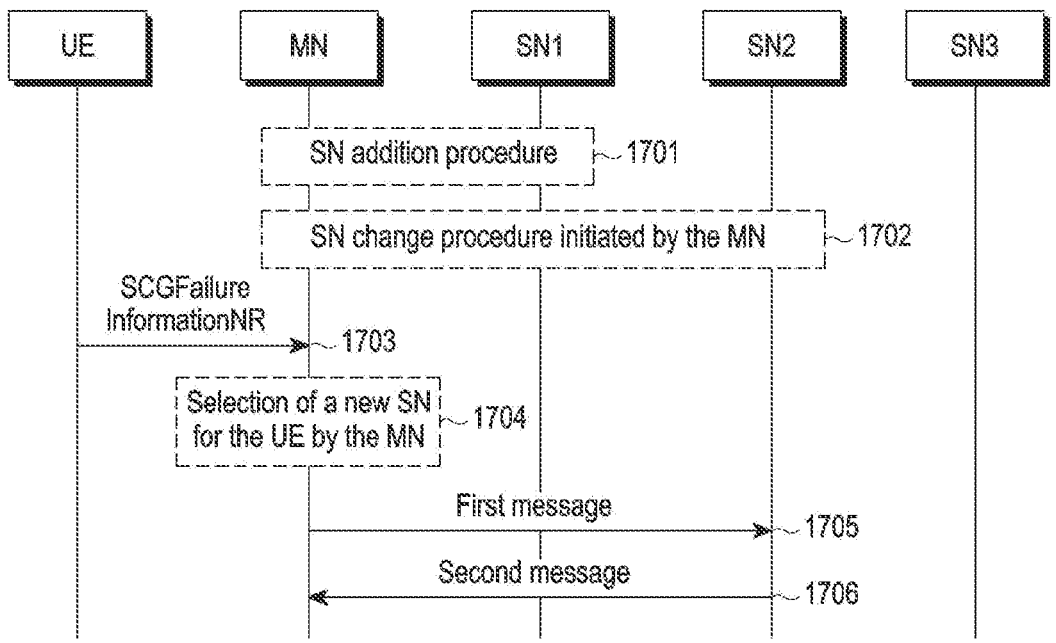
FIG. 17 schematically shows an eighth embodiment according to the present disclosure.

FIG. 17 schematically shows an eighth embodiment according to the present disclosure.

In this embodiment, whether to initiate a SN change procedure is decided by the MN. The MN is an eNB, and each of a SN1, a SN2 and a SN3 is an en-gNB. A detailed description of some steps that may obscure the subject of the present disclosure is omitted here.

Step 1701: The MN configures the SN of the UE as SN1. In a SN addition procedure of the X2, the SN1 reports the PSCell ID to the MN, while the MN knows the PLMN used by the SCG. The MN may determine the Tracking Area Code of the cell according to the information exchanged between the MN and the SN1 in an EN-DC Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 1702: The MN initiates the SN change procedure from the SN1 to the SN2. As described in step 1701, the MN adds the information of the SN2 to the information list of the SNs connected by the UE saved by the MN.

Step 1703: A SCG radio connection failure occurs for the UE on the SN2. The UE transmits an EUTRA RRC message, SCGFailureInformationNR, to the MN. The measurement report of the UE is included therein.

Step 1704: The MN may select SN3 as a SN suitable for the UE to access according to the measurement report of the UE. As described in step 1701, the MN adds the information of SN3 to the information list of the SNs connected by the UE saved by the MN. Therefore, the MN may know the information of the SN suitable for access.

The SN3 may be the same as the SN1.

The MN knows that the SCG radio connection failure occurred on the last SN configured for the UE according to SCGFailureInformationNR, and may also know, from the saved information list of the SNs connected by the UE, that the SN is the SN2, and know Cell ID of the PSCell of the SN2, and the TAC and PLMN identity, or the TAI to which the Cell belongs. Therefore, the MN may know the information of SN where the SCG radio connection failure occurs. In addition, the MN initiates the SN change procedure, so the SN previously configured for the UE by SN2 is the source SN of the SN change. The MN may know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of the source SN of the SN change.

If the MN receives the SCG failure information reported by the UE when the SN change procedure is not successfully completed, the MN may determine that the type of SCG radio connection failure is the SN change failure, and if not, the type of SCG radio connection failure is the radio link failure.

The MN may also calculate the time interval between the last SN change procedure and the SCG radio connection failure according to the time of the last SN change procedure and the received SCG failure information transmitted by the UE.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 1705: The MN transmits a first message to the SN where the SCG radio connection failure occurs, that is, the SN1. The first message may be a X2 message, RLF Indication, or a newly defined X2 message, SCG Failure Indication.

The message includes one or a combination of the following information:

SCG failure information;

Type of SN change failure, which may be SN change too early, or SN change to wrong cell;

One flag indicating that this SN change procedure is decided by the MN;

Identity allocated for the UE by the SN where a SCG radio connection failure occurs. The identity may be the identity, SgNB X2AP ID in the X2 message;

Identity allocated for the UE by the MN. The identity may be the identity, MeNB UE X2AP ID in the X2 message, and may also be C-RNTI;

Type of SCG radio connection failure, which may be a SN change failure or a radio link failure;

Information of a source SN of the SN change;

Information of a SN where a SCG radio connection failure occurs;

Information of a SN suitable for access after the radio connection failure; and

Time interval between the last SN change procedure and the SCG radio connection failure.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN1 ignores the type of SN change failure transmitted by the MN, the SN1 may determine the type of SN change failure by itself by means of the method in step 1704 according to the received information.

Step 1706: The above message indicates that the SN change procedure is decided by the MN, and thus the SN1 transmits a second message to the MN. The second message may be a X2 message, Handover Report, or a newly defined X2 message, SCG Change Report.

The message includes one or a combination of the following information:

SCG failure information;

Type of SN change failure, which may be SN change too early, or SN change to wrong cell;

Identity allocated for the UE by the MN in the last message;

Information of a source SN of the SN change;

Information of a SN where a SCG radio connection failure occurs;

Information of a SN suitable for access after the radio connection failure;

Type of SCG radio connection failure, which may be a SN change failure or a radio link failure;

Time interval between the last SN change procedure and the SCG radio connection failure; and Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN1 or the type of SN change failure determined by the MN itself, the MN may optimize the parameters used for generating a SN change decision, thereby reducing or avoiding the similar errors.

Figure 18:
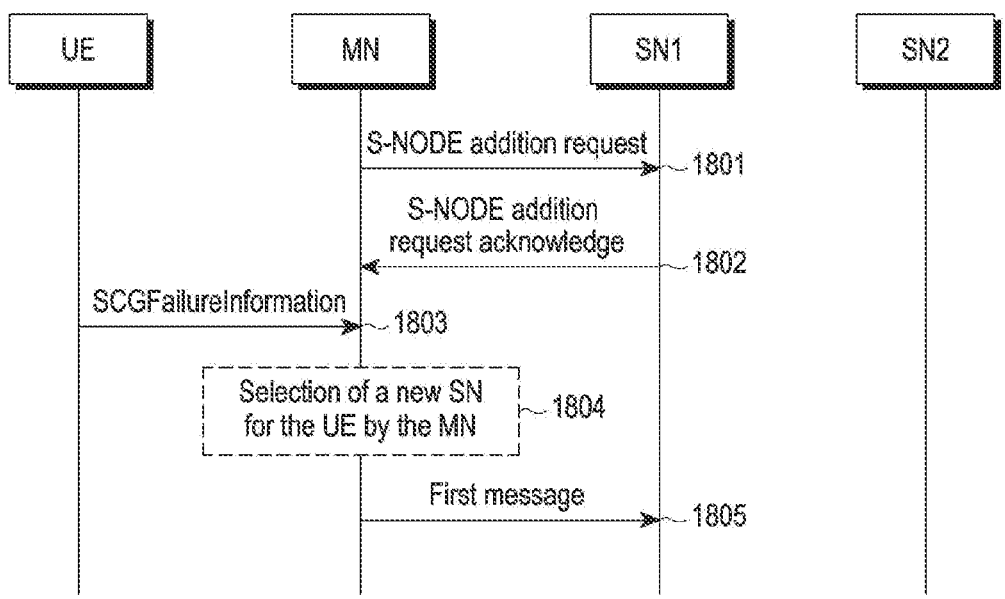
FIG. 18 schematically shows a ninth embodiment according to the present disclosure.

FIG. 18 schematically shows a ninth embodiment according to the present disclosure.

In this embodiment, whether to initiate a SN change procedure is decided by the SN. Each of a MN, a SN1 and a SN2 is a gNB. A detailed description of some steps that may obscure the subject of the present disclosure is omitted here.

Step 1801: The MN transmits an S-NODE Addition Request message to the SN1.

Step 1802: The SN1 transmits an S-NODE Addition Request Acknowledge message to the MN. The SN1 adds one piece of information, i.e., Mobility Information to the message. The Mobility Information refers to a digital identity generated by the SN and associated with configuration parameters in the SN used for deciding the SN change. The SN may find the configuration parameters in the SN used for deciding the SN change based on this identity.

Step 1803: Because the quality of the radio signal of the SN1 changes, and the SN1 does not initiate a SN change procedure from the SN1 to other SNs in time, a SCG radio connection failure occurs for the UE on the SN1. The UE transmits a NR RRC message, SCGFailureInformation, to the MN. The message includes one or a combination of the following information:

Information of the SN (i.e., the SN1) where a SCG radio connection failure occurs;

Information of the source SN in the last SN change procedure;

Cell identity of a cell of the SN suitable for the UE to access after the SCG failure reported by the UE, optionally, which may also include the TAC and PLMN identity, or the TAI to which the cell belongs;

Time interval between the last SN change procedure and the SCG radio connection failure;

Type of SCG radio connection failure, which may be a radio link failure;

C-RNTI allocated for the UE by the SN where the SCG radio connection failure occurs;

C-RNTI allocated for the UE by the source SN in the last SN change procedure;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 1804: The MN may select the SN2 as a SN suitable for the UE to access according to the cell of the SN suitable for access after the failure reported by the UE and/or the measurement report of the UE.

If the SCGFailureInformation message only carries the information of the SN where a SCG radio connection failure occurs, or the information of the source SN in the last SN change procedure is the same as the information of the SN where the SCG radio connection failure occurs, and the SN suitable for access is different from the SN where the SCG radio connection failure occurs and the type of SCG radio connection failure is the radio link failure, the MN may determine that the type of SN change failure is SN change too late.

Step 1805: The MN transmits a first message to the SN where the SCG radio connection failure occurs, i.e., the SN1. The first message may be a Xn message, Failure Indication, or a newly defined Xn message, SCG Failure Indication.

The message includes one or a combination of the following information:

SCG failure information;

Type of SN change failure, which may be SN change too late;

One flag indicating that this SN change procedure is decided by the SN;

Node information of the SN, including one or a combination of the following information:

Node ID of the node, optionally, including the TAC and PLMN identity, or the TAI to which the node belongs;

PSCell ID of the SN, optionally, including the TAC and PLMN identity, or the TAI to which the cell belongs;

Identity allocated for the UE by the SN where a SCG radio connection failure occurs. The identity may be the identity, S-NG-RAN node UE XnAP ID in the Xn message, and may also be C-RNTI;

Identity allocated for the UE by the MN. The identity may be the identity, M-NG-RAN node UE XnAP ID in the Xn message, and may also be C-RNTI;

Type of SCG radio connection failure, which may be a radio link failure;

Information of a source SN of the SN change;

Information of a SN where a SCG radio connection failure occurs;

Information of a SN suitable for access after the radio connection failure; and

Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

Whether to initiate the SN change procedure is decided by the SN1, and the SN1 may determine the type of SN change failure by itself according to the received information, thereby the SN1 may optimize the parameters used for generating a SN change decision, thereby reducing or avoiding the similar errors.

Figure 19:
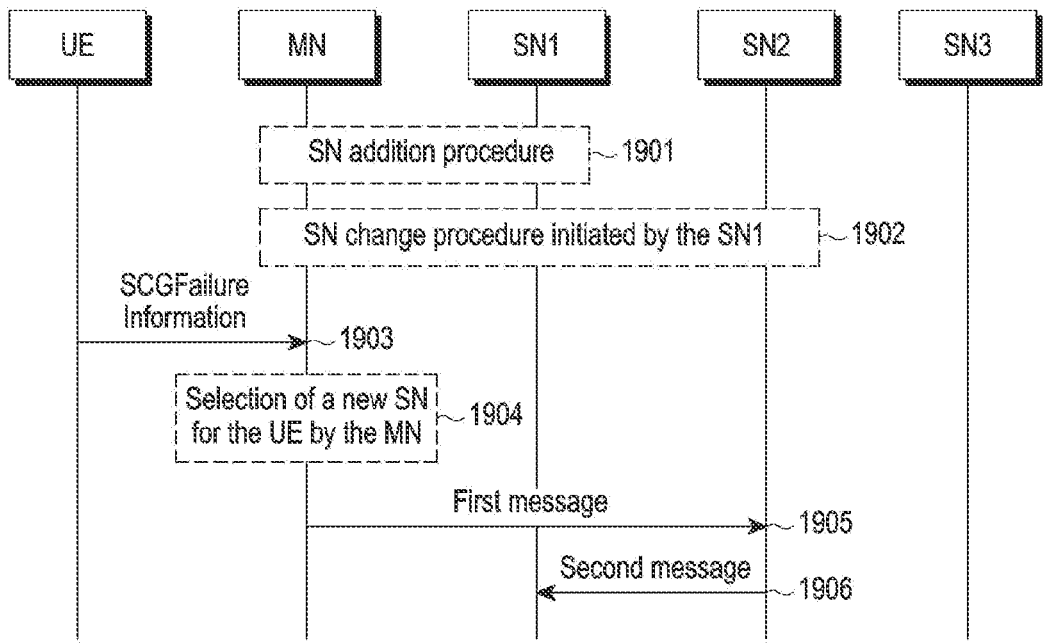
FIG. 19 schematically shows a tenth embodiment according to the present disclosure.

FIG. 19 schematically shows a tenth embodiment according to the present disclosure.

In this embodiment, whether to initiate a SN change procedure is decided by the SN. Each of a MN, a SN1, a SN2 and a SN3 is a gNB. A detailed description of some steps that may obscure the subject of the present disclosure is omitted here.

Step 1901: The MN configures the SN of the UE as SN1.

Step 1902: The SN1 initiates the SN change procedure from the SN1 to the SN2.

In the procedure, the SN1 adds one piece of information, Mobility Information, to the S-NODE Change Required message. The Mobility Information refers to a digital identity generated by the SN and associated with configuration parameters in the SN used for deciding the SN change. The SN may find the configuration parameters in the SN used for deciding the SN change based on this identity.

Step 1903: A SCG radio connection failure occurs for the UE on the SN2. The UE transmits a NR RRC message, SCGFailureInformation, to the MN. The message includes one or a combination of the following information:

Information of the SN (i.e., the SN2) where a SCG radio connection failure occurs;

Information of the source SN (i.e., the SN1) in the last SN change procedure;

Cell identity of a cell of the SN suitable for the UE to access after the SCG failure reported by the UE, optionally, which may also include the TAC and PLMN identity, or the TAI to which the cell belongs;

Time interval between the last SN change procedure and the SCG radio connection failure;

Type of SCG radio connection failure, which may be a radio link failure;

C-RNTI allocated for the UE by the SN where the SCG radio connection failure occurs;

C-RNTI allocated for the UE by the source SN in the last SN change procedure;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 1904: The MN may select SN3 as a SN suitable for the UE to access according to the cell of the SN suitable for access after the failure reported by the UE and/or the measurement report of the UE.

The SN3 may be the same as the SN1.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 1905: The MN transmits a first message to the SN where the SCG radio connection failure occurs, that is, the SN2. The first message may be a Xn message, Failure Indication, or a newly defined Xn message, SCG Failure Indication.

The message includes one or a combination of the following information:

SCG failure information;

Type of SN change failure, which may be SN change too early, or SN change to wrong cell;

One flag indicating that this SN change procedure is decided by the SN;

Node information of the SN (i.e., the SN1), including one or a combination of the following information:

Node ID of the node, optionally, including the TAC and PLMN identity, or the TAI to which the node belongs;

PSCell ID of the SN, optionally, including the TAC and PLMN identity, or the TAI to which the cell belongs;

Identity allocated for the UE by the SN where a SCG radio connection failure occurs. The identity may be the identity, S-NG-RAN node UE XnAP ID in the Xn message, and may also be C-RNTI;

Identity allocated for the UE by the source SN in the last SN change procedure, which may be C-RNTI;

Identity allocated for the UE by the MN. The identity may be the identity, M-NG-RAN node UE XnAP ID in the Xn message, and may also be C-RNTI;

Type of SCG radio connection failure, which may be a SN change failure or a radio link failure;

Information of a source SN of the SN change;

Information of a SN where a SCG radio connection failure occurs;

Information of a SN suitable for access after the radio connection failure;

Time interval between the last SN change procedure and the SCG radio connection failure; and Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN2 ignores the type of SN change failure transmitted by the MN, the SN2 may determine the type of SN change failure by itself by means of the method in step 1904 according to the received information.

Step 1906: The above message indicates that the SN change procedure is decided by the SN1, and thus the SN2 transmits a second message to the SN1. The second message may be a Xn message, Handover Report, or a newly defined Xn message, SCG Change Report.

The message includes one or a combination of the following information:

SCG failure information;

Type of SN change failure, which may be SN change too early, or SN change to wrong cell;

Identity allocated for the UE by the source SN in the SN change procedure which may be C-RNTI;

Information of the source SN of the SN change;

Information of a SN where a SCG radio connection failure occurs;

Information of a SN suitable for access after the radio connection failure;

Type of SCG radio connection failure, which may be a SN change failure or a radio link failure;

Time interval between the last SN change procedure and the SCG radio connection failure; and Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN2 or the type of SN change failure determined by the SN1 itself, the SN1 may find and optimize the configuration parameters used for generating a SN change decision according to the identity allocated for the UE by the source SN of the SN change procedure, and/or Mobility Information, thereby reducing or even avoiding the SN change failure later.

Figure 20:
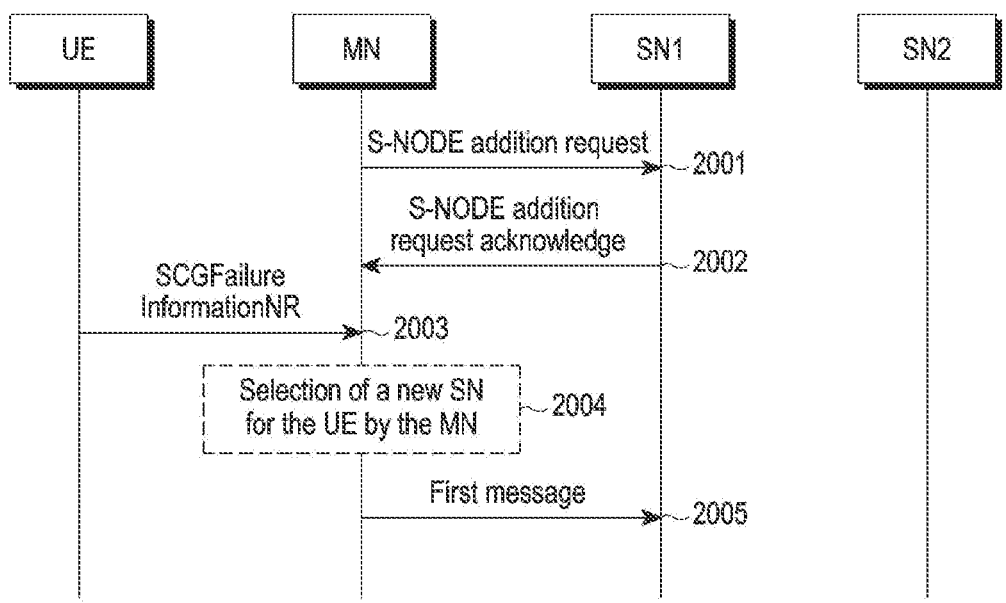
FIG. 20 schematically shows an eleventh embodiment according to the present disclosure.

FIG. 20 schematically shows an eleventh embodiment according to the present disclosure.

In this embodiment, whether to initiate a SN change procedure is decided by the SN. A MN is an eNB, and each of a SN1 and a SN2 is an ng-gNB. A detailed description of some steps that may obscure the subject of the present disclosure is omitted here.

Step 2001: The MN transmits a SgNB Addition Request message to the SN1.

Step 2002: The SN1 transmits a SgNB Addition Request Acknowledge message to the MN. The SN1 adds one piece of information, Mobility Information, in this message. The Mobility Information refers to a digital identity generated by the SN and associated with configuration parameters in the SN used for deciding the SN change. The SN may find the configuration parameters in the SN used for deciding the SN change based on this identity.

Step 2003: Because the quality of the radio signal of the SN1 changes, and the SN1 does not initiate a SN change procedure from the SN1 to other SNs in time, a SCG radio connection failure occurs for the UE on the SN1. The UE transmits an EUTRA RRC message, SCGFailureInformationNR, to the MN. The message includes one or a combination of the following information:

Information of the SN (i.e., the SN1) where a SCG radio connection failure occurs;

Information of the source SN in the last SN change procedure;

Cell identity of a cell of the SN suitable for the UE to access after the SCG failure reported by the UE, optionally, which may also include the TAC and PLMN identity, or the TAI to which the cell belongs;

Time interval between the last SN change procedure and the SCG radio connection failure;

Type of SCG radio connection failure, which may be a radio link failure;

C-RNTI allocated for the UE by the SN where the SCG radio connection failure occurs;

C-RNTI allocated for the UE by the source SN in the last SN change procedure;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 2004: The MN may select the SN2 as a SN suitable for the UE to access according to the cell of the SN suitable for access after the SCG failure reported by the UE and/or the measurement report of the UE.

If the SCGFailureInformationNR message only carries the information of the SN where a SCG radio connection failure occurs, or the information of the source SN in the last SN change procedure is the same as the information of the SN where the SCG radio connection failure occurs, and the SN suitable for access is different from the SN where the SCG radio connection failure occurs and the type of SCG radio connection failure is the radio link failure, the MN may determine that the type of SN change failure is SN change too late.

Step 2005: The MN transmits a first message to the SN where the SCG radio connection failure occurs, i.e., the SN1. The first message may be a X2 message, RLF Indication, or a newly defined X2 message, SCG Failure Indication.

The message includes one or a combination of the following information:

SCG failure information;

Type of SN change failure, which may be SN change too late;

One flag indicating that this SN change procedure is decided by the SN;

Node information of the SN, including one or a combination of the following information:

Node ID of the node, optionally, including the TAC and PLMN identity, or the TAI to which the node belongs;

PSCell ID of the SN, optionally, including the TAC and PLMN identity, or the TAI to which the cell belongs;

Identity allocated for the UE by the SN where the SCG radio connection failure occurs. The identity may be the identity, SgNB UE X2AP ID in the X2 message, and may also be C-RNTI;

Identity allocated for the UE by the MN. The identity may be the identity, MgNB UE X2AP ID in the X2 message, and may also be C-RNTI;

Type of SCG radio connection failure, which may be a radio link failure;

Information of a source SN of the SN change;

Information of a SN where a SCG radio connection failure occurs;

Information of a SN suitable for access after the radio connection failure; and

Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

Whether to initiate the SN change procedure is decided by the SN1, and the SN1 may determine the type of SN change failure by itself according to the received information, thereby the SN1 may optimize the parameters used for generating a SN change decision, thereby reducing or avoiding the similar errors.

Figure 21:
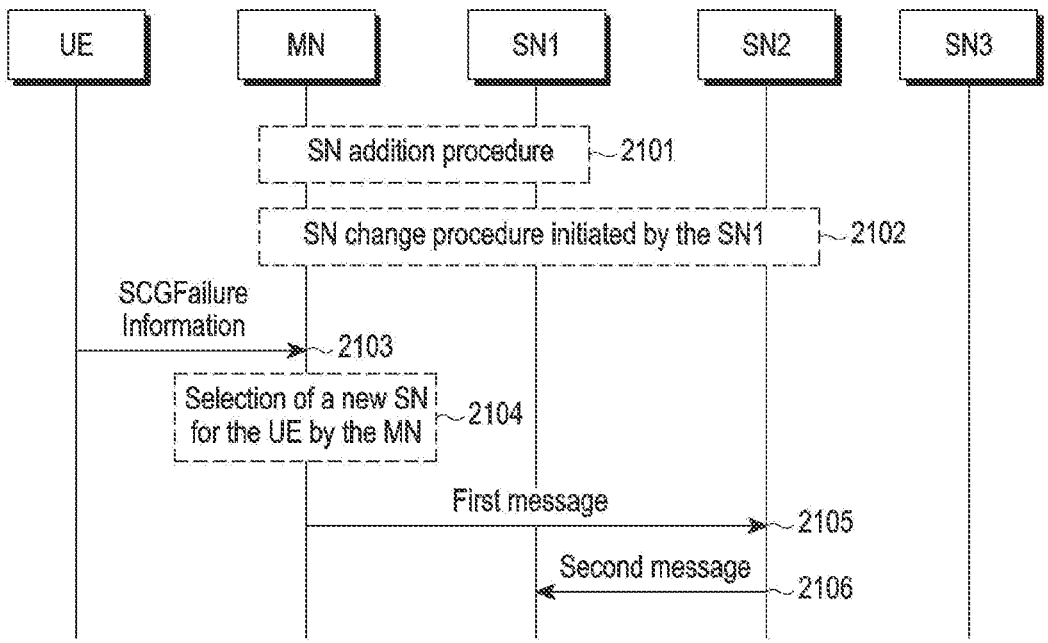
FIG. 21 schematically shows a twelfth embodiment according to the present disclosure.

FIG. 21 schematically shows a twelfth embodiment according to the present disclosure.

In this embodiment, whether to initiate a SN change procedure is decided by the SN. A MN is an eNB, and each of a SN1, a SN2 and a SN3 is an en-gNB. A detailed description of some steps that may obscure the subject of the present disclosure is omitted here.

Step 2101: The MN configures the SN of the UE as SN1.

Step 2102: The SN1 initiates the SN change procedure from the SN1 to the SN2.

In the procedure, the SN1 adds one piece of information, Mobility Information, to the SgNB Change Required message. The Mobility Information refers to a digital identity generated by the SN and associated with configuration parameters in the SN used for deciding the SN change. The SN may find the configuration parameters in the SN used for deciding the SN change based on this identity.

Step 2103: A SCG radio connection failure occurs for the UE on the SN2. The UE transmits an EUTRA RRC message, SCGFailureInformationNR, to the MN. The message includes one or a combination of the following information:

Information of the SN (i.e., the SN2) where a SCG radio connection failure occurs;

Information of the source SN (i.e., the SN1) in the last SN change procedure;

Cell identity of a cell of the SN suitable for the UE to access after the SCG failure reported by the UE, optionally, which may also include the TAC and PLMN identity, or the TAI to which the cell belongs;

Time interval between the last SN change procedure and the SCG radio connection failure;

Type of SCG radio connection failure, which may be a radio link failure;

C-RNTI allocated for the UE by the SN where the SCG radio connection failure occurs;

C-RNTI allocated for the UE by the source SN in the last SN change procedure;

C-RNTI allocated for the UE by the MN; and

Measurement report of the UE.

Wherein the information of the SN includes Cell ID of the PSCell, and optionally, it may also include the TAC and PLMN identity, or the TAI to which the Cell belongs.

Step 2104: The MN may select SN3 as a SN suitable for the UE to access according to the cell of the SN suitable for access after the failure reported by the UE and/or the measurement report of the UE.

The SN3 may be the same as the SN1.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 2105: The MN transmits a first message to the SN where the SCG radio connection failure occurs, that is, the SN2. The first message may be a X2 message, RLF Indication, or a newly defined X2 message, SCG Failure Indication.

The message includes one or a combination of the following information:

SCG failure information;

Type of SN change failure, which may be SN change too early, or SN change to wrong cell;

One flag indicating that this SN change procedure is decided by the SN;

Node information of the SN (i.e., the SN1), including one or a combination of the following information:

Node ID of the node, optionally, including the TAC and PLMN identity, or the TAI to which the node belongs;

PSCell ID of the SN, optionally, including the TAC and PLMN identity, or the TAI to which the cell belongs;

Identity allocated for the UE by the SN where a SCG radio connection failure occurs. The identity may be the identity, SgNB UE X2AP ID in the X2 message, and may also be C-RNTI;

Identity allocated for the UE by the source SN in the last SN change procedure, which may be C-RNTI;

Identity allocated for the UE by the MN. The identity may be the identity, MeNB UE X2AP ID in the X2 message, and may also be C-RNTI;

Type of SCG radio connection failure, which may be a SN change failure or a radio link failure;

Information of a source SN of the SN change;

Information of a SN where a SCG radio connection failure occurs;

Information of a SN suitable for access after the radio connection failure;

Time interval between the last SN change procedure and the SCG radio connection failure; and Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN2 ignores the type of SN change failure transmitted by the MN, the SN2 may determine the type of SN change failure by itself by means of the method in step 2104 according to the received information.

Step 2106: The above message indicates that the SN change procedure is decided by the SN1, and thus the SN2 transmits a second message to the SN1. The second message may be a X2 message, Handover Report, or a newly defined X2 message, SCG Change Report.

The message includes one or a combination of the following information:

SCG failure information;

Type of SN change failure, which may be SN change too early, or SN change to wrong cell;

Identity allocated for the UE by the source SN in the SN change procedure which may be C-RNTI;

Information of the source SN of the SN change;

Information of a SN where a SCG radio connection failure occurs;

Information of a SN suitable for access after the radio connection failure;

Type of SCG radio connection failure, which may be a SN change failure or a radio link failure;

Time interval between the last SN change procedure and the SCG radio connection failure; and Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

According to the type of SN change failure determined by the SN2 or the type of SN change failure determined by the SN1 itself, the SN1 may find and optimize the configuration parameters used for generating a SN change decision according to the identity allocated for the UE by the source SN of the SN change procedure, and/or Mobility Information, thereby reducing or even avoiding the SN change failure later.

Figure 22:
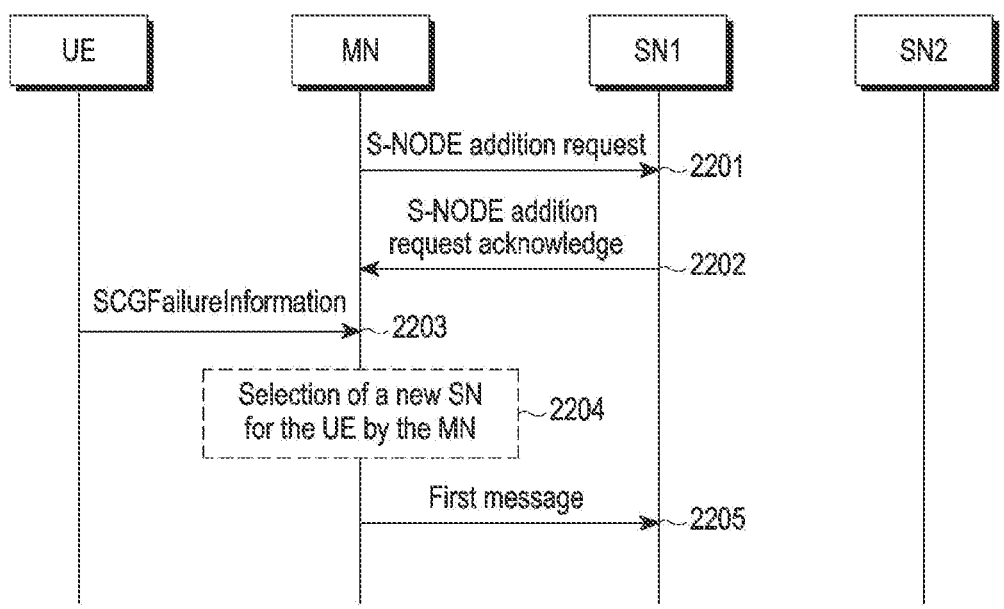
FIG. 22 schematically shows a thirteenth embodiment according to the present disclosure.

FIG. 22 schematically shows a thirteenth embodiment according to the present disclosure.

In this embodiment, whether to initiate a SN change procedure is decided by the SN. Each of a MN, a SN1 and a SN2 is a gNB. A detailed description of some steps that may obscure the subject of the present disclosure is omitted here.

Step 2201: The MN transmits an S-Node Addition Request message to the SN1.

Step 2202: The SN1 transmits an S-Node Addition Request Acknowledge message to the MN. The SN1 adds one piece of information, i.e., Mobility Information to the message. The Mobility Information refers to a digital identity generated by the SN and associated with configuration parameters in the SN used for deciding the SN change. The SN may find the configuration parameters in the SN used for deciding the SN change based on this identity. In addition, the SN1 reports the PSCell ID and its PLMN to the MN. The MN may determine the Tracking Area Code of the cell according to the information exchanged between the MN and the SN1 in a Xn Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 2203: Because the quality of the radio signal of the SN1 changes, and the SN1 does not initiate a SN change procedure from the SN1 to other SNs in time, a SCG radio connection failure occurs for the UE on the SN1. The UE transmits a NR RRC message, SCGFailureInformation, to the MN. The measurement report of the UE is included therein.

Step 2204: The MN may select the SN2 as a SN suitable for the UE to access according to the measurement report of the UE. As described in step 2201, the MN adds the information of the SN2 to the information list of the SNs connected by the UE saved by the MN. Therefore, the MN may know the information of the SN suitable for access.

The MN knows that the SCG radio connection failure occurred on the last SN configured for the UE according to SCGFailureInformation, and may also know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of SN where the SCG radio connection failure occurs, the information of the SN should also be the information of the source SN of the SN change, and the SN suitable for access is different from the SN where the SCG radio connection failure occurs.

In addition, the MN does not initiate the SN change procedure, nor receives the signaling of the SN change procedure initiated by the SN, so the MN may determine that the type of SCG radio connection failure is a radio link failure.

Based on the above information, the MN may determine that the type of SN change failure is SN change too late.

Step 2205: The MN transmits a first message to the SN where the SCG radio connection failure occurs, i.e., the SN1. The first message may be a Xn message, Failure Indication, or a newly defined Xn message, SCG Failure Indication.

The message includes one or a combination of the following information:

SCG failure information;

Type of SN change failure, which may be SN change too late;

One flag indicating that this SN change procedure is decided by the SN;

Node information of the SN (i.e., the SN1), including one or a combination of the following information:

Node ID of the node, optionally, including the TAC and PLMN identity, or the TAI to which the node belongs;

PSCell ID of the SN, optionally, including the TAC and PLMN identity, or the TAI to which the cell belongs;

Identity allocated for the UE by the SN where a SCG radio connection failure occurs. The identity may be the identity, SgNB UE X2AP ID in the X2 message, and may also be C-RNTI;

Identity allocated for the UE by the MN. The identity may be the identity, MgNB UE X2AP ID in the Xn message, and may also be C-RNTI;

Type of SCG radio connection failure, which may be a radio link failure;

Information of a source SN of the SN change;

Information of a SN where a SCG radio connection failure occurs;

Information of a SN suitable for access after the radio connection failure;

Mobility Information; and

Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

The SN1 may also determine the information of the source SN of the SN change, and/or the information of the SN where the SCG radio connection failure occurs, and/or the information of the SN suitable for access after the radio connection failure by itself, according to the received information list of the SNs connected by the UE.

If the MN does not transmit the type of SN change failure, or the SN1 ignores the type of SN change failure transmitted by the MN, the SN1 may determine the type of SN change failure as SN change too late by itself by means of the method in step 2203 according to the received information.

Whether to initiate the SN change procedure is decided by the SN1, and the SN1 may determine the type of SN change failure by itself according to the received information, thereby the SN1 may optimize the parameters used for generating a SN change decision, thereby reducing or avoiding the similar errors.

Figure 23:
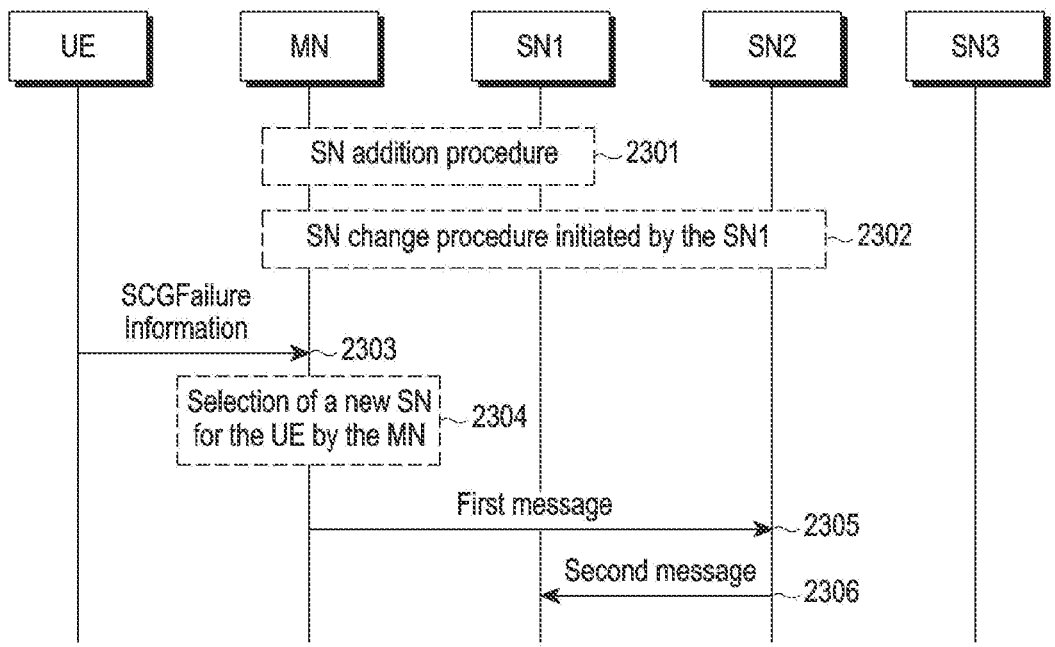
FIG. 23 schematically shows a fourteenth embodiment according to the present disclosure.

FIG. 23 schematically shows a fourteenth embodiment according to the present disclosure.

In this embodiment, whether to initiate a SN change procedure is decided by the SN. Each of a MN, a SN1, a SN2 and a SN3 is a gNB. A detailed description of some steps that may obscure the subject of the present disclosure is omitted here.

Step 2301: The MN configures the SN of the UE as SN1. In a SN addition procedure of the Xn, the SN1 reports the PSCell ID and its PLMN to the MN. The MN may determine the Tracking Area Code of the cell according to the information exchanged between the MN and the SN1 in an EN-DC Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 2302: The SN1 initiates the SN change procedure from the SN1 to the SN2. As described in step 2301, the MN adds the information of the SN2 to the information list of the SNs connected by the UE saved by the MN.

In the procedure, the SN1 adds one piece of information, Mobility Information, to the SgNB Change Required message. The Mobility Information refers to a digital identity generated by the SN and associated with configuration parameters in the SN used for deciding the SN change. The SN may find the configuration parameters in the SN used for deciding the SN change based on this identity.

Step 2303: A SCG radio connection failure occurs for the UE on the SN2. The UE transmits a NR RRC message, SCGFailureInformation, to the MN. The measurement report of the UE is included therein.

Step 2304: The MN may select SN3 as a SN suitable for the UE to access according to the measurement report of the UE. As described in step 2301, the MN adds the information of SN3 to the information list of the SNs connected by the UE saved by the MN. Therefore, the MN may know the information of the SN suitable for access.

The SN3 may be the same as the SN1.

The MN knows that the SCG radio connection failure occurred on the last SN configured for the UE according to SCGFailureInformation, and may also know, from the saved information list of the SNs connected by the UE, that the SN is the SN2, and know Cell ID of the PSCell of the SN2, and the TAC and PLMN identity, or the TAI to which the Cell belongs. Therefore, the MN may know the information of SN where the SCG radio connection failure occurs. In addition, the MN initiates the SN change procedure, so the SN previously configured for the UE by SN2 is the source SN of the SN change. The MN may know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of the source SN of the SN change.

If the MN receives the SCG failure information reported by the UE when the SN change procedure is not successfully completed, the MN may determine that the type of SCG radio connection failure is the SN change failure, and if not, the type of SCG radio connection failure is the radio link failure.

The MN may also calculate the time interval between the last SN change procedure and the SCG radio connection failure according to the time of the last SN change procedure and the received SCG failure information transmitted by the UE.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 2305: The MN transmits a first message to the SN where the SCG radio connection failure occurs, that is, the SN2. The first message may be a Xn message, Failure Indication, or a newly defined Xn message, SCG Failure Indication.

The message includes one or a combination of the following information:
SCG failure information;
Type of SN change failure, which may be SN change too early, or SN change to wrong cell;
One flag indicating that this SN change procedure is decided by the SN;
Node information of the SN (i.e., the SN1), including one or a combination of the following information:
Node ID of the node, optionally, including the TAC and PLMN identity, or the TAI to which the node belongs;
PSCell ID of the SN, optionally, including the TAC and PLMN identity, or the TAI to which the cell belongs;
Identity allocated for the UE by the SN where a SCG radio connection failure occurs. The identity may be the identity, S-NG-RAN node UE XnAP ID in the Xn message;
Identity allocated for the UE by the MN. The identity may be the identity, M-NG-RAN node UE XnAP ID in the Xn message, and may also be C-RNTI;
Type of SCG radio connection failure, which may be a SN change failure or a radio link failure;
Information of a source SN of the SN change;
Information of a SN where a SCG radio connection failure occurs;
Information of a SN suitable for access after the radio connection failure;
Time interval between the last SN change procedure and the SCG radio connection failure;
Information list of the SNs connected by the UE, or UE History Information including the information list of the SNs connected by the UE; and
Mobility Information.
Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN2 ignores the type of SN change failure transmitted by the MN, the SN2 may determine the type of SN change failure by itself by means of the method in step 2304 according to the received information.

Step 2306: The above message indicates that the SN change procedure is decided by the SN1, and thus the SN2 transmits a second message to the SN1. The second message may be a Xn message, Handover Report, or a newly defined Xn message, SCG Change Report.

The message includes one or a combination of the following information:
SCG failure information;
Type of SN change failure, which may be SN change too early, or SN change to wrong cell;
Information of a source SN of the SN change;
Information of a SN where a SCG radio connection failure occurs;
Information of a SN suitable for access after the radio connection failure;
Type of SCG radio connection failure, which may be a SN change failure or a radio link failure;
Time interval between the last SN change procedure and the SCG radio connection failure;
Mobility Information; and
Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

The SN1 may also determine the information of the source SN of the SN change, and/or the information of the SN where the SCG radio connection failure occurs, and/or the information of the SN suitable for access after the radio connection failure by itself, according to the received information list of the SNs connected by the UE.

If the SN2 does not transmit the type of SN change failure, or the SN1 ignores the type of SN change failure transmitted by the SN2, the SN1 may determine the type of SN change failure by itself by means of the method in step 2304 according to the received information.

According to the type of SN change failure determined by the SN2 or the type of SN change failure determined by the SN1 itself, the SN1 may find and optimize the configuration parameters used for generating a SN change decision according to the identity allocated for the UE by the source SN of the SN change procedure, and/or Mobility Information, thereby reducing or even avoiding the SN change failure later.

Figure 24:
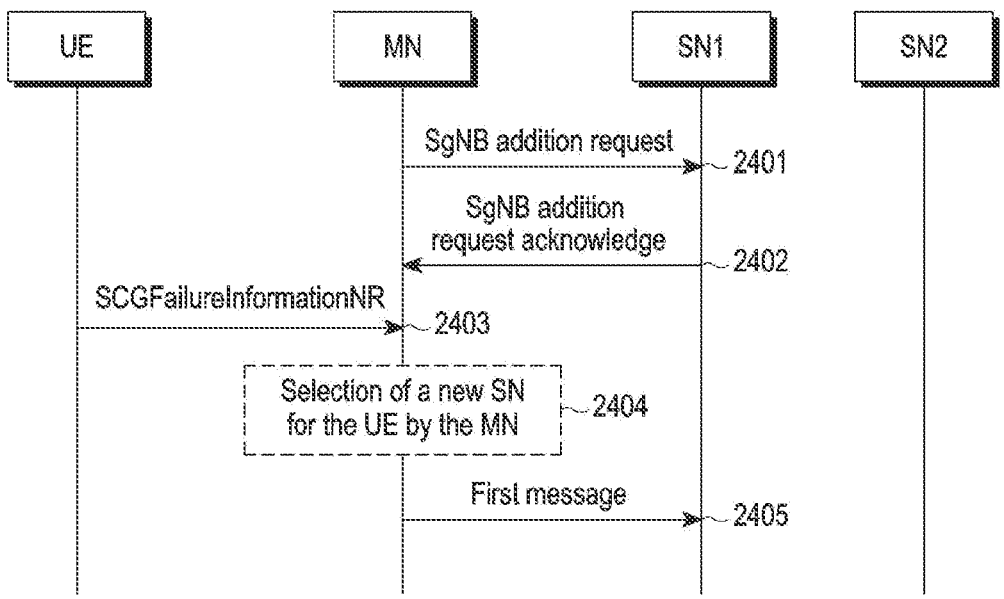
FIG. 24 schematically shows a fifteenth embodiment according to the present disclosure.

FIG. 24 schematically shows a fifteenth embodiment according to the present disclosure;

In this embodiment, whether to initiate a SN change procedure is decided by the SN. A MN is an eNB, and each of a SN1 and a SN2 is an en-gNB. A detailed description of some steps that may obscure the subject of the present disclosure is omitted here.

Step 2401: The MN transmits a SgNB Addition Request message to the SN1.

Step 2402: The SN1 transmits a SgNB Addition Request Acknowledge message to the MN. The SN1 adds one piece of information, Mobility Information, in this message. The Mobility Information refers to a digital identity generated by the SN and associated with configuration parameters in the SN used for deciding the SN change. The SN may find the configuration parameters in the SN used for deciding the SN change based on this identity. The SN1 reports the PSCell ID to the MN, while the MN knows the PLMN used by the SCG. The MN may determine the Tracking Area Code of the cell according to the information exchanged between the MN and the SN1 in an EN-DC Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 2403: Because the quality of the radio signal of the SN1 changes, and the SN1 does not initiate a SN change procedure from the SN1 to other SNs in time, a SCG radio connection failure occurs for the UE on the SN1. The UE transmits an EUTRA RRC message, SCGFailureInformationNR, to the MN. The measurement report of the UE is included therein.

Step 2404: The MN may select the SN2 as a SN suitable for the UE to access according to the measurement report of the UE. As described in step 2401, the MN adds the information of the SN2 to the information list of the SNs connected by the UE saved by the MN. Therefore, the MN may know the information of the SN suitable for access.

The MN knows that the SCG radio connection failure occurred on the last SN configured for the UE according to SCGFailureInformationNR, and may also know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of SN where the SCG radio connection failure occurs, the information of the SN should also be the information of the source SN of the SN change, and the SN suitable for access is different from the SN where the SCG radio connection failure occurs.

In addition, the MN does not initiate the SN change procedure, nor receives the signaling of the SN change procedure initiated by the SN, so the MN may determine that the type of SCG radio connection failure is a radio link failure.

Based on the above information, the MN may determine that the type of SN change failure is SN change too late.

Step 2405: The MN transmits a first message to the SN where the SCG radio connection failure occurs, i.e., the SN1. The first message may be a X2 message, RLF, or a newly defined X2 message, SCG Failure Indication.

The message includes one or a combination of the following information:
SCG failure information;
Type of SN change failure, which may be SN change too late;
One flag indicating that this SN change procedure is decided by the SN;
Node information of the SN (i.e., the SN1), including one or a combination of the following information:
Node ID of the node, optionally, including the TAC and PLMN identity, or the TAI to which the node belongs;
PSCell ID of the SN, optionally, including the TAC and PLMN identity, or the TAI to which the cell belongs;
Identity allocated for the UE by the SN where a SCG radio connection failure occurs. The identity may be the identity, SgNB UE X2AP ID in the X2 message, and may also be C-RNTI;
Identity allocated for the UE by the MN. The identity may be the identity, MgNB UE X2AP ID in the X2 message, and may also be C-RNTI;
Type of SCG radio connection failure, which may be a radio link failure;
Information of a source SN of the SN change;
Information of a SN where a SCG radio connection failure occurs;
Information of a SN suitable for access after the radio connection failure;
Mobility Information; and
Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

The SN1 may also determine the information of the source SN of the SN change, and/or the information of the SN where the SCG radio connection failure occurs, and/or the information of the SN suitable for access after the radio connection failure by itself, according to the received information list of the SNs connected by the UE.

If the MN does not transmit the type of SN change failure, or the SN1 ignores the type of SN change failure transmitted by the MN, the SN1 may determine the type of SN change failure by itself by means of the method in step 2403 according to the received information.

Whether to initiate the SN change procedure is decided by the SN1, and the SN1 may determine the type of SN change failure by itself according to the received information, thereby the SN1 may optimize the parameters used for generating a SN change decision, thereby reducing or avoiding the similar errors.

Figure 25:
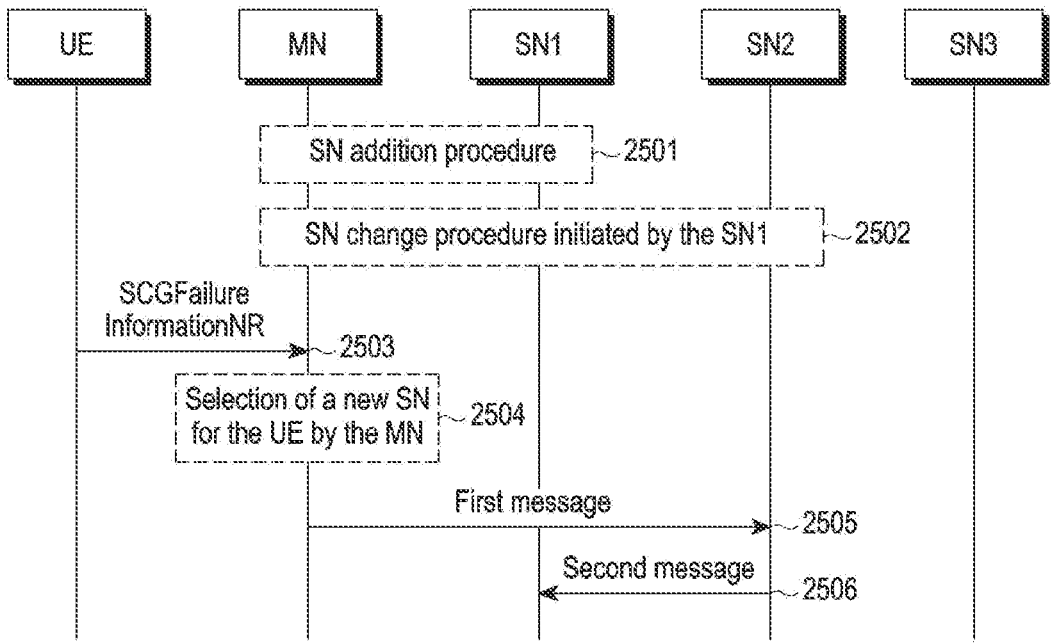
FIG. 25 schematically shows a sixteenth embodiment according to the present disclosure.

FIG. 25 schematically shows a sixteenth embodiment according to the present disclosure.

In this embodiment, whether to initiate a SN change procedure is decided by the SN. A MN is an eNB, and each of a SN1, a SN2 and a SN3 is an en-gNB. A detailed description of some steps that may obscure the subject of the present disclosure is omitted here.

Step 2501: The MN configures the SN of the UE as SN1. In a SN addition procedure of the X2, the SN1 reports the PSCell ID to the MN, while the MN knows the PLMN used by the SCG. The MN may determine the Tracking Area Code of the cell according to the information exchanged between the MN and the SN1 in an EN-DC Setup procedure.

The MN adds information of the SN1 to the information list of the SNs connected by the UE in the UE History Information saved by the MN. The information list of the SNs may include information of one or more SNs connected by the UE. The information of the SN connected by the UE may be the identification information of the SN, and/or the duration during the UE is connected to the SN, and/or the reason why the SN is configured as the SN for the UE, and/or the associated MN identification information. The identification information of the SN may include the PSCell ID, and optionally, it may also include the TAC and PLMN identity, or the TAI to which the Cell belongs, and/or the node ID. The MN identification information may be the PCell ID and/or a node ID of the MN. Optionally, the MN may save the list as a separate information instead of adding it to the UE History Information.

Step 2502: The SN1 initiates the SN change procedure from the SN1 to the SN2. As described in step 2501, the MN adds the information of the SN2 to the information list of the SNs connected by the UE saved by the MN.

In the procedure, the SN1 adds one piece of information, Mobility Information, to the SgNB Change Required message. The Mobility Information refers to a digital identity generated by the SN and associated with configuration parameters in the SN used for deciding the SN change. The SN may find the configuration parameters in the SN used for deciding the SN change based on this identity.

Step 2503: A SCG radio connection failure occurs for the UE on the SN2. The UE transmits an EUTRA RRC message, SCGFailureInformationNR, to the MN. The measurement report of the UE is included therein.

Step 2504: The MN may select SN3 as a SN suitable for the UE to access according to the measurement report of the UE. As described in step 2501, the MN adds the information of SN3 to the information list of the SNs connected by the UE saved by the MN. Therefore, the MN may know the information of the SN suitable for access.

The SN3 may be the same as the SN1.

The MN knows that the SCG radio connection failure occurred on the last SN configured for the UE according to SCGFailureInformationNR, and may also know, from the saved information list of the SNs connected by the UE, that the SN is the SN2, and know Cell ID of the PSCell of the SN2, and the TAC and PLMN identity, or the TAI to which the Cell belongs. Therefore, the MN may know the information of SN where the SCG radio connection failure occurs. In addition, the MN initiates the SN change procedure, so the SN previously configured for the UE by SN2 is the source SN of the SN change. The MN may know, from the saved information list of the SNs connected by the UE, that the SN is the SN1, and know Cell ID of the PSCell of the SN1, and the TAC and PLMN identity, or the TAI to which the Cell belongs. Therefore, the MN may know the information of the source SN of the SN change.

If the MN receives the SCG failure information reported by the UE when the SN change procedure is not successfully completed, the MN may determine that the type of SCG radio connection failure is the SN change failure, and if not, the type of SCG radio connection failure is the radio link failure.

The MN may also calculate the time interval between the last SN change procedure and the SCG radio connection failure according to the time of the last SN change procedure and the received SCG failure information transmitted by the UE.

If the type of SCG radio connection failure is the SN change failure, or the time interval between the last SN change procedure and the SCG radio connection failure is lower than a preset threshold, and the SN2 is different from the SN1 and the SN3, the MN may determine that the type of SN change failure is SN change too early or SN change to wrong cell. If the SN1 is the same as the SN3, the type of SN change failure is SN change too early; and if the SN1 is different from the SN3, the type of SN change failure is SN change to wrong cell.

Step 2505: The MN transmits a first message to the SN where the SCG radio connection failure occurs, that is, the SN2. The first message may be a X2 message, RLF Indication, or a newly defined X2 message, SCG Failure Indication.

The message includes one or a combination of the following information:

SCG failure information;

Type of SN change failure, which may be SN change too early, or SN change to wrong cell;

One flag indicating that this SN change procedure is decided by the SN;

Node information of the SN (i.e., the SN1), including one or a combination of the following information:

Node ID of the node, optionally, including the TAC and PLMN identity, or the TAI to which the node belongs;

PSCell ID of the SN, optionally, including the TAC and PLMN identity, or the TAI to which the cell belongs;

Identity allocated for the UE by the SN where a SCG radio connection failure occurs. The identity may be the identity, SgNB X2AP ID in the X2 message;

Identity allocated for the UE by the MN. The identity may be the identity, MeNB UE X2AP ID in the X2 message, and may also be C-RNTI;

Type of SCG radio connection failure, which may be a SN change failure or a radio link failure;

Information of a source SN of the SN change;

Information of a SN where a SCG radio connection failure occurs;

Information of a SN suitable for access after the radio connection failure;

Time interval between the last SN change procedure and the SCG radio connection failure;

Information list of the SNs connected by the UE, or UE History Information including the information list of the SNs connected by the UE; and Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

If the MN does not transmit the type of SN change failure, or the SN2 ignores the type of SN change failure transmitted by the MN, the SN2 may determine the type of SN change failure by itself by means of the method in step 2504 according to the received information.

Step 2506: The above message indicates that the SN change procedure is decided by the SN1, and thus the SN2 transmits a second message to the SN1. The second message may be a X2 message, Handover Report, or a newly defined X2 message, SCG Change Report.

The message includes one or a combination of the following information:

SCG failure information;

Type of SN change failure, which may be SN change too early, or SN change to wrong cell;

Information of a source SN of the SN change;

Information of a SN where a SCG radio connection failure occurs;

Information of a SN suitable for access after the radio connection failure;

Type of SCG radio connection failure, which may be a SN change failure or a radio link failure;

Time interval between the last SN change procedure and the SCG radio connection failure;

Mobility Information; and

Information list of the SNs connected by the UE, or UE History Information including the information list of the SNs connected by the UE.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs.

The SN1 may also determine the information of the source SN of the SN change, and/or the information of the SN where the SCG radio connection failure occurs, and/or the information of the SN suitable for access after the radio connection failure by itself, according to the received information list of the SNs connected by the UE.

If the SN2 does not transmit the type of SN change failure, or the SN1 ignores the type of SN change failure transmitted by the SN2, the SN1 may determine the type of SN change failure by itself by means of the method in step 2504 according to the received information.

According to the type of SN change failure determined by the SN2 or the type of SN change failure determined by the SN1 itself, the SN1 may find and optimize the configuration parameters used for generating a SN change decision according to the identity allocated for the UE by the source SN of the SN change procedure, and/or Mobility Information, thereby reducing or even avoiding the SN change failure later.

Figure 26:
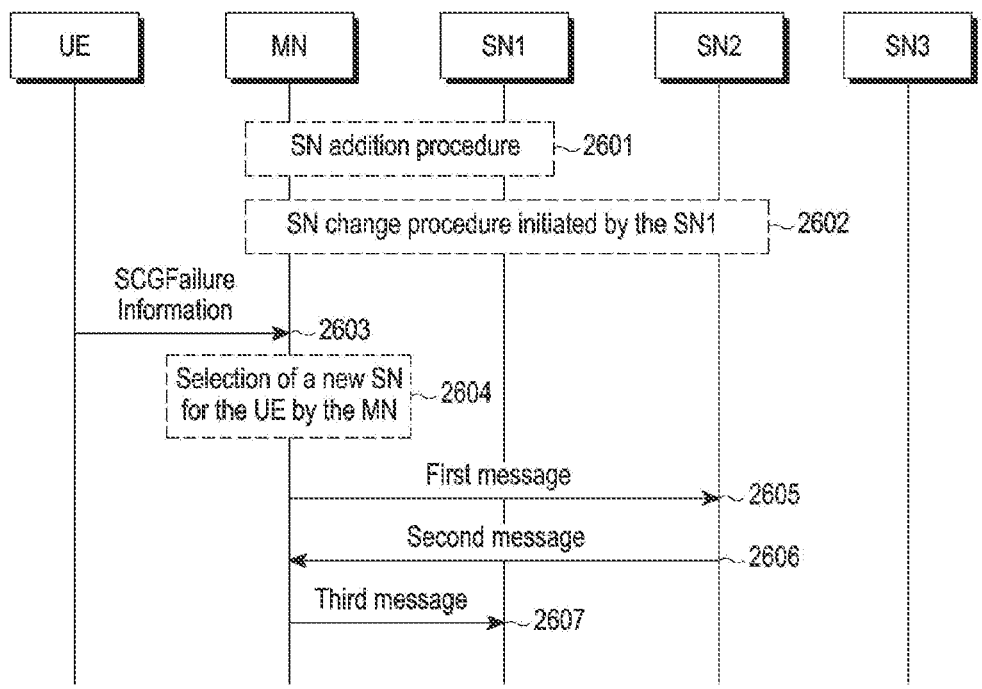
FIG. 26 schematically shows another implementation of the tenth embodiment of FIG. 19.

FIG. 26 schematically shows another implementation of the tenth embodiment of FIG. 19.

In this embodiment, whether to initiate a SN change procedure is decided by the SN. Each of a MN, a SN1, a SN2 and a SN3 is a gNB. A detailed description of some steps that may obscure the subject of the present disclosure is omitted here.

Steps 2601-2605 are similar to steps 1901-1905.

Step 2606: The SN2 transmits a second message to the MN.

The above message indicates that a SN change procedure is decided by the SN1, and the SN2 may transmit the second message to the MN, which in turn forwards it to the SN1. The second message may be a Xn message, Handover Report, or a newly defined Xn message, SCG Change Report.

The message includes one or a combination of the following information:

SCG failure information;

Type of SN change failure, which may be SN change too early, or SN change to wrong cell;

Identity allocated for the UE by the source SN in the SN change procedure. The identity may be C-RNTI;

Information of a source SN of the SN change;

Information of a SN where a SCG radio connection failure occurs;

Information of a SN suitable for access after the radio connection failure;

Type of SCG radio connection failure, which may be a SN change failure or a radio link failure;

Time interval between the last SN change procedure and the SCG radio connection failure; and Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs. Optionally, the information of the source SN of the SN change may also include a node ID of the node, and optionally, the TAC and PLMN identity, or the TAI to which the node belongs.

Step 2607: The MN determines that the received message should be forwarded to the SN1, according to the information of the source SN of the SN change. The MN transmits a third message to the SN1 to forward the content in the second message to the SN1. The second message may be a Xn message, Handover Report, or a newly defined Xn message, SCG Change Report.

The MN may modify the type of SN change failure according to its own determination.

The SN1 may receive the type of SN change failure determined in the third message or the type of SN change failure determined by the SN1 itself, and the SN1 may find and optimize the configuration parameters used for generating a SN change decision according to the identity allocated for the UE by the source SN in the SN change procedure and/or Mobility Information, thereby reducing or even avoiding the SN change failure later.

Figure 27:
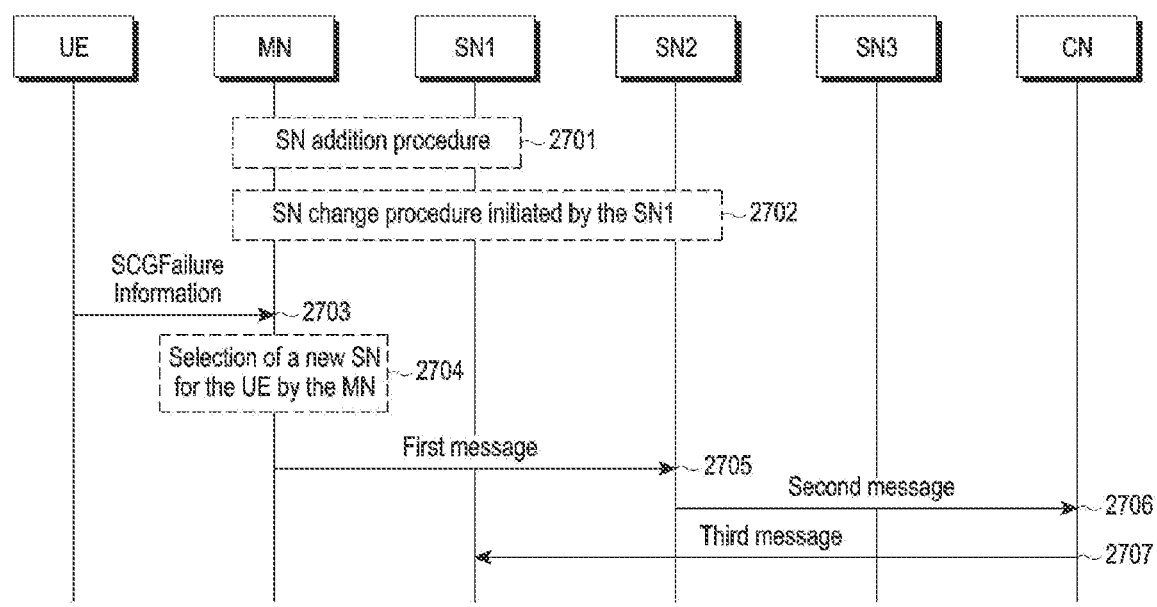
FIG. 27 schematically shows another implementation of the tenth embodiment of FIG. 19.

FIG. 27 schematically shows another implementation of the tenth embodiment of FIG. 19.

In this embodiment, whether to initiate a SN change procedure is decided by the SN. Each of a MN, a SN1, a SN2 and a SN3 is a gNB. There is no Xn interface between the SN1 and the SN2, and the SN1 and the SN2 are connected to the CN. A detailed description of some steps that may obscure the subject of the present disclosure is omitted here.

Steps 2701-2705 are similar to steps 1901-1905.

Step 2706: The SN2 transmits a second message to the CN.

The above message indicates that a SN change procedure is decided by the SN1, and the SN2 may transmit the second message to the CN, which in turn forwards it to the SN1. The second message may be an Ng message, Uplink RAN Configuration Transfer, or a newly defined Ng message.

The message includes one or a combination of the following information:

SCG failure information;

Type of SN change failure, which may be SN change too early, or SN change to wrong cell;

Identity allocated for the UE by the source SN in the SN change procedure. The identity may be C-RNTI;

Information of a source SN of the SN change;

Information of a SN where a SCG radio connection failure occurs;

Information of a SN suitable for access after the radio connection failure;

Type of SCG radio connection failure, which may be a SN change failure or a radio link failure;

Time interval between the last SN change procedure and the SCG radio connection failure; and Mobility Information.

Wherein the information of the SN is Cell ID of the PSCell, and optionally, it may also include the TAC and PLMN identity, or the TAI to which the Cell belongs. The information of the SN suitable for access includes Cell ID of a cell which belongs to the SN, and optionally, it may also include the TAC and PLMN identity, or the TAI to which the Cell belongs. Optionally, the information of the source SN of the SN change may also include a node ID of the node, and optionally, the TAC and PLMN identity, or the TAI to which the node belongs.

Step 2707: The CN may determine the address of SN1 according to the node ID or PSCell ID, and the TAC and PLMN identity, or the TAI in the information of the source SN of the SN change. The CN transmits a third message to the SN1 to forward the content in the second message to the SN1. The third message may be an Ng message, Downlink RAN Configuration Transfer, or a newly defined Ng message.

According to the type of SN change failure determined by the SN2 or the type of SN change failure determined by the SN1 itself, the SN1 may find and optimize the configuration parameters used for generating a SN change decision according to the identity allocated for the UE by the source SN in the SN change procedure and/or Mobility Information, thereby reducing or even avoiding the SN change failure later.

Figure 28:
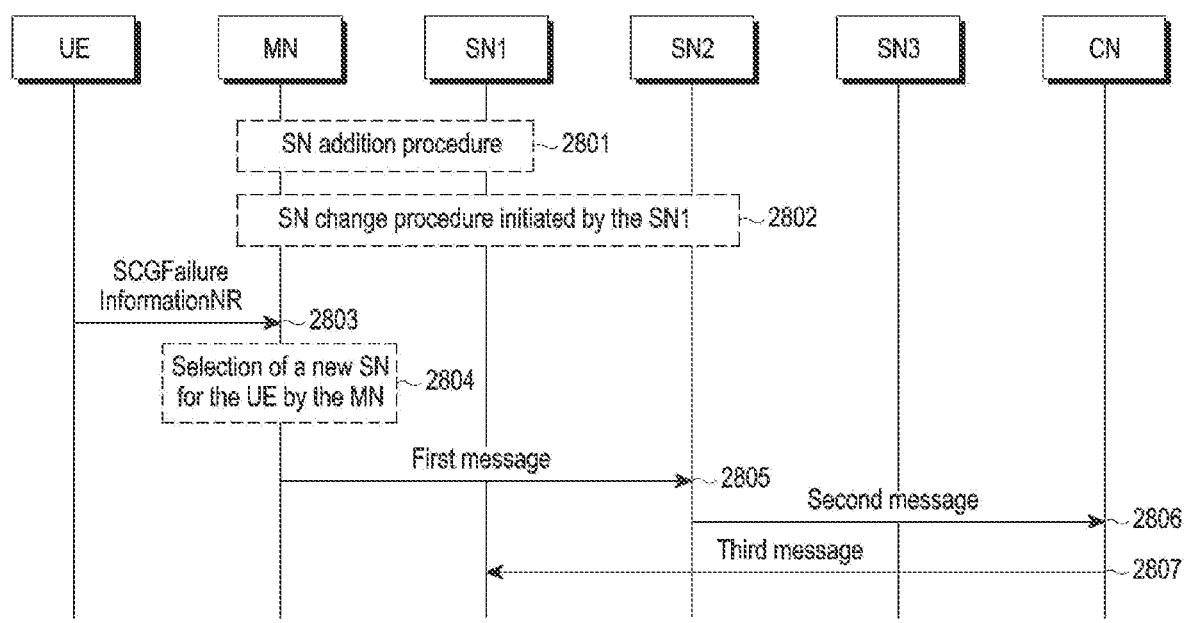
FIG. 28 schematically shows another implementation of the sixteenth embodiment of FIG. 25.

FIG. 28 schematically shows another implementation of the sixteenth embodiment of FIG. 25.

In this embodiment, whether to initiate a SN change procedure is decided by the SN. Each of a MN, a SN1, a SN2 and a SN3 is a gNB. There is no Xn interface between the SN1 and the SN2, and the SN1 and the SN2 are connected to the CN. A detailed description of some steps that may obscure the subject of the present disclosure is omitted here.

Steps 2801-2805 are similar to steps 2501-2505.

Step 2806: The SN2 transmits a second message to the CN.

The above message indicates that a SN change procedure is decided by the SN1, and the SN2 may transmit the second message to the CN, which in turn forwards it to the SN1. The second message may be an Ng message, Uplink RAN Configuration Transfer, or a newly defined Ng message.

The message includes one or a combination of the following information:

SCG failure information;
Type of SN change failure, which may be SN change too early, or SN change to wrong cell;
Information of a source SN of the SN change;
Information of a SN where a SCG radio connection failure occurs;
Information of a SN suitable for access after the radio connection failure;
Type of SCG radio connection failure, which may be a SN change failure or a radio link failure;
Time interval between the last SN change procedure and the SCG radio connection failure;
Mobility Information; and
Information list of the SNs connected by the UE, or UE History Information including the information list of the SNs connected by the UE.

Wherein the information of the SN is Cell Id of the PSCell, and optionally, it may also include the TAC and PLMN identity, or the TAI to which the Cell belongs. The information of the SN suitable for access includes Cell Id of a cell which belongs to the SN, and optionally, it may also include the TAC and PLMN identity, or the TAI to which the Cell belongs. Optionally, the information of the source SN of the SN change may also include a node ID of the node, and optionally, the TAC and PLMN identity, or the TAI to which the node belongs.

Step 2807: The CN may determine the address of SN1 according to the node ID or PSCell ID, and the TAC and PLMN identity, or the TAI in the information of the source SN of the SN change. The CN transmits a third message to the SN1 to forward the content in the second message to the SN1. The third message may be an Ng message, Downlink RAN Configuration Transfer, or a newly defined Ng message.

The SN1 may also determine the information of the source SN of the SN change, and/or the information of the SN where the SCG radio connection failure occurs, and/or the information of the SN suitable for access after the radio connection failure by itself, according to the received information list of the SNs connected by the UE.

If the SN2 does not transmit the type of SN change failure, or the SN1 ignores the type of SN change failure transmitted by the SN2, the SN1 may determine the type of SN change failure by itself by means of the method in step 2304 according to the received information.

According to the type of SN change failure determined by the SN2 or the type of SN change failure determined by the SN1 itself, the SN1 may find and optimize the configuration parameters used for generating a SN change decision according to Mobility Information, thereby reducing or even avoiding the SN change failure later.

Figure 29:
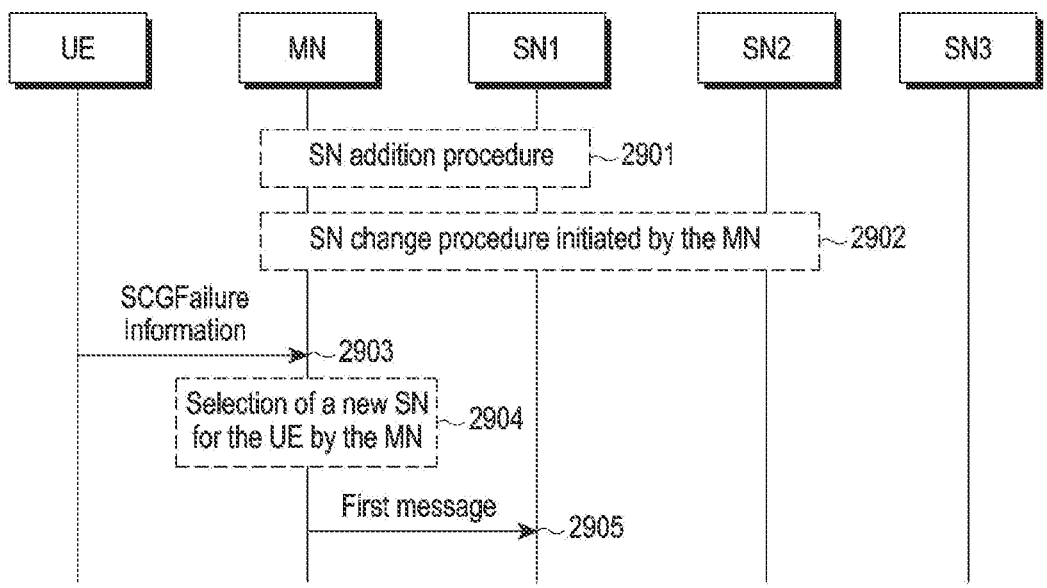
FIG. 29 schematically shows another implementation of the tenth embodiment of FIG. 19.

FIG. 29 schematically shows another implementation of the tenth embodiment of FIG. 19.

In this embodiment, whether to initiate a SN change procedure is decided by the SN. Each of a MN, a SN1, a SN2 and a SN3 is a gNB. A detailed description of some steps that may obscure the subject of the present disclosure is omitted here.

Steps 2901-2904 are similar to steps 1901-1904.

Step 2905: The MN transmits a first message to the SN, i.e., SN1, that initiates the SN change procedure. The first message may be a Xn message, Handover Report, or a newly defined Xn message, SCG Change Report.

The message includes one or a combination of the following information:

SCG failure information;
Type of SN change failure, which may be SN change too early, or SN change to wrong cell;
Identity allocated for the UE by the source SN in the SN change procedure. The identity may be C-RNTI;
Information of a source SN of the SN change;
Information of a SN where a SCG radio connection failure occurs;
Information of a SN suitable for access after the radio connection failure;
Type of SCG radio connection failure, which may be a SN change failure or a radio link failure;
Time interval between the last SN change procedure and the SCG radio connection failure; and
Mobility Information.

Wherein the information of the SN is Cell Id of the PSCell, and optionally, it may also include the TAC and PLMN identity, or the TAI to which the Cell belongs. The information of the SN suitable for the UE to access includes Cell Id of a cell which belongs to the SN, and optionally, it may also include the TAC and PLMN identity, or the TAI to which the Cell belongs.

According to the type of SN change failure determined by the MN, or the type of SN change failure determined by the SN1 itself, the SN1 may find and optimize the configuration parameters used for generating a SN change decision based on the identity allocated for the UE by the source SN in the SN change procedure and/or Mobility Information, thereby reducing or even avoiding the SN change failure later.

Figure 30:
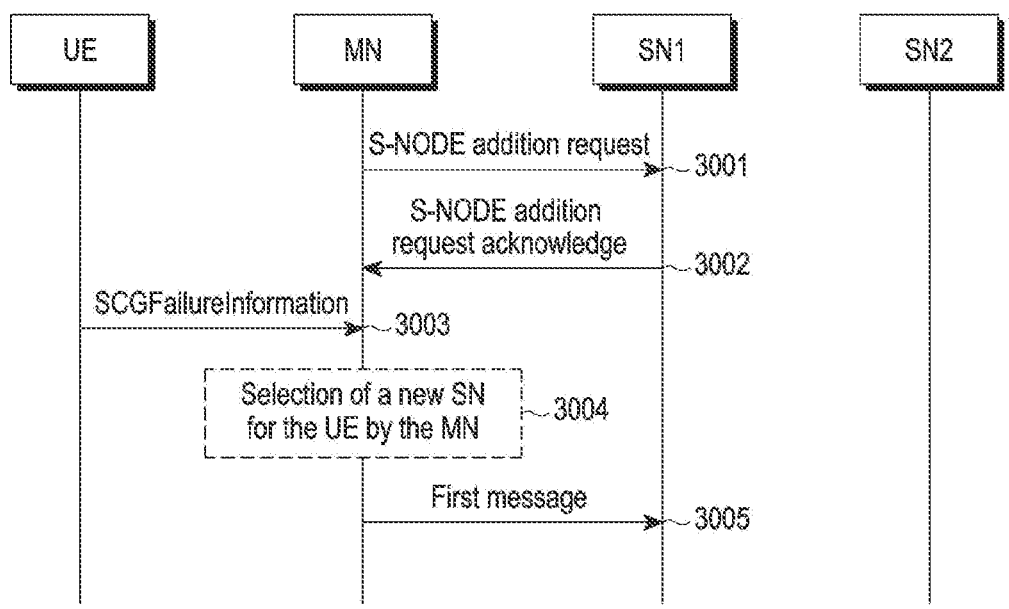
FIG. 30 schematically shows another implementation of the thirteenth embodiment of FIG. 22.

FIG. 30 schematically shows another implementation of the thirteenth embodiment of FIG. 22.

In this embodiment, whether to initiate a SN change procedure is decided by the SN. Each of a MN, a SN1 and a SN2 is a gNB. A detailed description of some steps that may obscure the subject of the present disclosure is omitted here.

Step 3001: The MN transmits an S-Node Addition Request message to the SN1. The message may carry information, i.e., Location Information at S-NODE reporting, which takes a value of pscell, and requires the SN1 to report the information on the PSCell selected by the SN1, regardless of whether the core network entity requires the MN to report the location information of the UE.

Step 3002: The SN1 transmits an S-Node Addition Request Acknowledge message to the MN. The message may carry information, i.e., Location Information at S-NODE, and report the information on the PSCell selected by SN1 to the MN, regardless of whether the MN requires the SN1 to report this information. The MN may determine the TAC of the cell according to the information exchanged between the MN and the SN1 in the Xn Setup procedure.

The SN1 adds one piece of information, i.e., Mobility Information to the message. The Mobility Information refers to a digital identity generated by the SN and associated with configuration parameters in the SN used for deciding the SN change. The SN may find the configuration parameters in the SN used for deciding the SN change based on this identity.

The MN adds information of the SN1 to the information list of the SNs connected by the UE in the UE History Information saved by the MN. The information list of the SNs may include information of one or more SNs connected by the UE. The information of the SN connected by the UE may be identification information of the SN, and/or the duration of the UE connecting to the SN, and/or the reason why the SN is configured as the SN for the UE, and/or identification information of the associated MN. The identification information of the SN may include a PSCell Id, and optionally, may also include the TAC and PLMN identity, or the TAI to which the Cell belongs, and/or the node ID. The identification information of the MN may be the PCell Id and/or a node ID of the MN. Optionally, the MN may save the list as a separate information instead of adding it to the UE History Information.

Steps 3003-3005 are similar to steps 2203-2205.

Since whether to initiate the SN change procedure is decided by the SN1 and the SN1 may determine the type of SN change failure based on the received information, the SN1 may use this to optimize the parameters used for generating a SN change decision, thereby reducing or avoiding similar errors.

Figure 31:
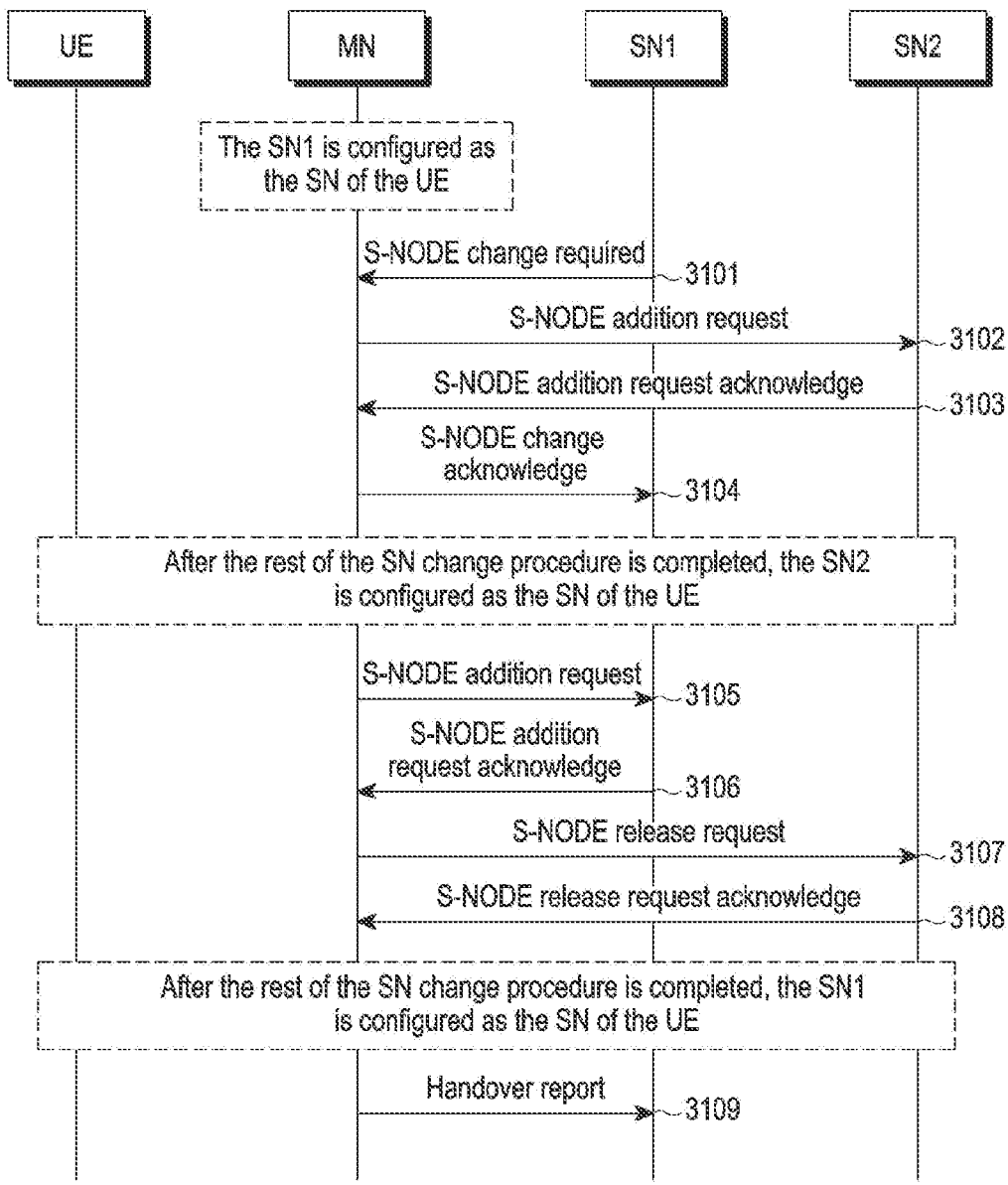
FIG. 31 schematically shows a fourteenth embodiment according to the present disclosure.

FIG. 31 schematically shows the fourteenth embodiment.

In this embodiment, the MN, SN1 and SN2 may all be a gNB. A detailed description of some steps that may obscure the subject of the present invention is omitted here.

The SN1 is configured as the SN of the UE, and Cell 1 of the SN1 is set as the PSCell of the UE.

Step 3101: the SN1 decides to initiate the SN change procedure. The SN1 initiates an S-Node Change Required message to the MN, requesting that SN2 be configured as the SN of the UE. The message includes a list of information of the PSCell connected by the UE generated by the SN1. In this embodiment, the list includes the information of Cell 1 of the SN1. The information includes the cell identity (NG-RAN Cell Identity) of Cell 1, the duration of the UE connecting to the Cell, the reason for the PSCell being changed, and the associated MN identification information. The MN saves the list of the information of the PSCell, and determines that this SN change procedure is initiated by the SN, and the MN also saves this determination.

Steps 3102-3103: The MN initiates an SN addition procedure to the SN2. In step 3102, the MN sends an S-Node addition request message to the SN2, and in step 3103, the SN2 sends an S-Node addition request acknowledge message to the MN.

Step 3104: The MN initiates SN change acknowledge to the SN1.

After the SN change procedure ends, the SN2 is configured as the SN of the UE, and Cell 2 of the SN2 is set as the PSCell of the UE.

During or after the SN change procedure, the SN1 may also use a already-defined Xn message, such as Access and Mobility Indication, or a newly defined Xn message, such as SN Information Update, to send the list of the information of the PSCell connected by the UE generated by the SN1 to the MN.

Steps 3105-3106: In a short time period after the last SN change procedure ends, the MN decides to initiate the SN change procedure. The MN initiates an SN addition procedure to the SN1, requiring the SN1 to be configured as the SN of the UE. In step 3105, the MN sends an S-Node addition request message to the SN1, and in step 3106, the SN1 sends an S-Node addition request acknowledge message to the MN.

Steps 3107-3108: The MN initiates an SN release procedure to the SN2. In step 3107, the MN sends an S-Node release request message to the SN2, and in step 3108, the SN2 sends an S-Node release request acknowledge message to the MN. The message includes the list of the information of the PSCell connected by the UE generated by the SN2. In this embodiment, the list includes the information of Cell 2 of the SN2. The information includes at least one of the following: the cell identity (NG-RAN Cell Identity) of Cell 2, the duration of the UE connecting to the Cell, the reason for the PSCell being changed, and the associated MN identification information. The MN saves the list of the information of the PSCell, and determines that this SN change procedure is initiated by the MN, and the MN also saves this determination.

After the SN change procedure ends, the SN1 is configured as the SN of the UE, and Cell 1 of the SN1 is set as the PSCell of the UE.

In the process of the UE connecting to the SN1, the SN1 may use the Xn message to send, to the MN, the list of the information of the PSCell connected by the UE generated by the SN1. In this embodiment, the list includes the information of Cell 1 of the SN1. The information includes the cell identity (NG-RAN Cell Identity) of Cell 1 and the duration of the UE connecting to the Cell. The MN saves the list of the information of the PSCell.

The MN may know from the received list of the information of the PSCell that the PSCell of the UE is changed from Cell 1 to Cell 2, and then to Cell 1, and the duration of the UE connecting to Cell 2 is lower than the preset threshold. The MN determines that SN change Ping-pong has occurred, and the SN change procedure from the SN1 to the SN2 is initiated by the SN.

Step 3109: The MN sends a Handover Report to the SN1. The message indicates that the failure type of the SN change is SN change Ping-pong, and carries the list of the information of the PSCell received by the MN.

The SN1 may determine that SN change Ping-pong has occurred based on the received information, thereby the SN1 may optimize the parameters used for generating a SN change decision so as to reduce or avoid the reoccurrence of similar errors.

Figure 32:
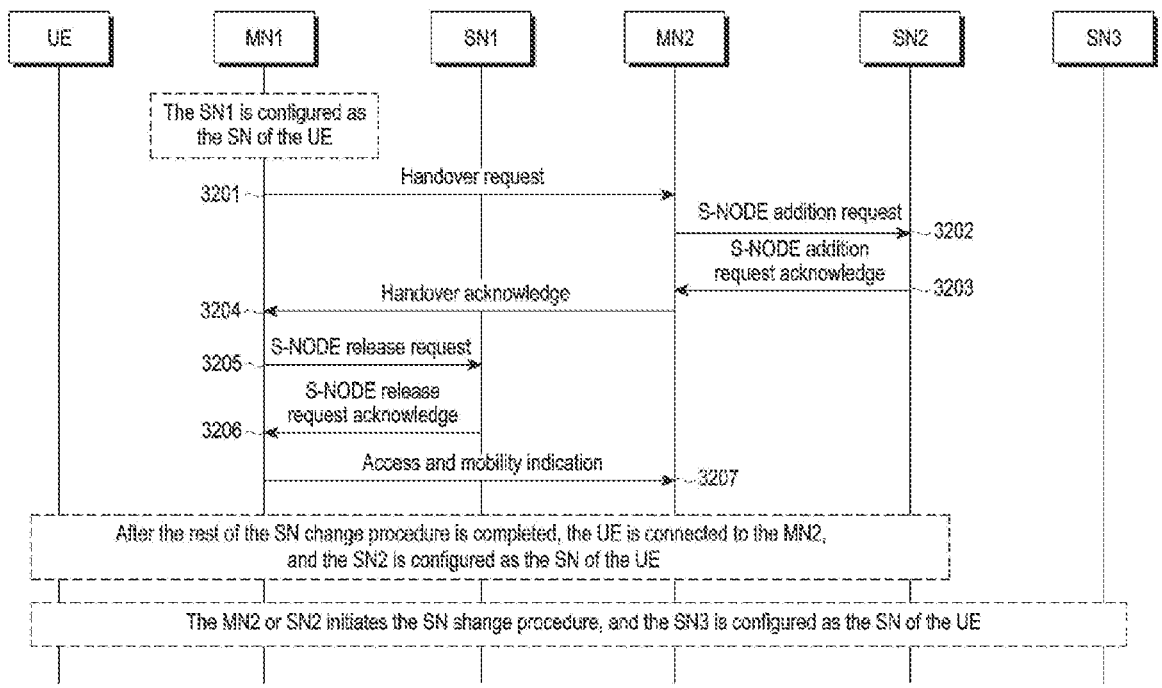
FIG. 32 schematically shows a fifteenth embodiment according to the present disclosure.

FIG. 32 schematically shows the fifteenth embodiment.

In this embodiment, The MN1, MN2, SN1, SN2 and SN3 may all be a gNB. A detailed description of some steps that may obscure the subject of the present invention is omitted here.

The SN1 is configured as the SN of the UE, and Cell 1 of the SN1 is set as the PSCell of the UE.

Step 3201: The MN1 decides to initiate a handover procedure to the MN2. The MN1 sends a handover request to the MN2.

Steps 3202-3203: The MN2 decides to configure the SN2 as the SN of the UE. The MN2 initiates an SN addition procedure to the SN2. In step 3202, the MN2 sends an S-Node addition request message to the SN2, and in step 3203, the SN2 sends an S-Node addition request acknowledge message to the MN2. Cell 2 of the SN2 is set as the PSCell of the UE.

Step 3204: The MN2 sends a handover acknowledge to the MN.

Steps 3205-3206: The MN1 initiates an SN release procedure to the SN1. In step 3205, MN1 sends an S-Node release request message to the SN1. In step 3206, the SN1 sends an S-Node release request acknowledge message to the MN1. The message includes a list of information of the PSCell connected by the UE generated by the SN1. In this embodiment, the list includes the information of Cell 1 of the SN1. The information includes at least one of the following: the cell identity (NG-RAN Cell Identity) of Cell 1, the duration of the UE connecting to the Cell, the reason for the PSCell being changed, and the associated MN identification information.

Step 3207: The MN1 sends an Access and Mobility Indication message to the MN2, and the message includes the list of the information of the PSCell connected by the UE received by the MN1. The message may also be other Xn messages, or a newly defined Xn message.

The MN1 may also send, to the MN2, the list of the information of the PSCell connected by the UE received by the MN1 in step 3201.

After a short time period in which the UE is connected to the SN2, the MN2 or the SN2 initiates the SN change procedure, the SN3 is set as the SN of the UE, and Cell 3 of SN3 is set as the PSCell of the UE. In this process, the SN2 sends, to the MN2, the list of the information of the PSCell connected by the UE generated by the SN2, as in step 3206.

The MN2 may know from the received list of the information of the PSCell that the PSCell of the UE is changed from Cell 1 to Cell 2, and then to Cell 3, and the duration of the UE connecting to Cell 2 is lower than the preset threshold and the MN2 determines that the SN change Ping-pong has occurred.

Since the process of configuring SN2 as the SN of the UE is initiated by MN2 in step 3202, the MN2 may optimize the parameters used for generating a SN change decision according to the received information so as to reduce or avoid the reoccurrence of similar errors.

Figure 33:
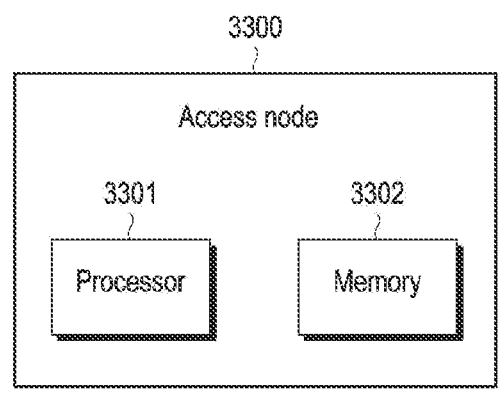
FIG. 33 schematically shows a block diagram of an access node according to an exemplary embodiment of the present disclosure.

FIG. 33 shows a block diagram of an access node according to an exemplary embodiment of the present disclosure. As shown in FIG. 33, the access node 3300 includes a processor 3301 and a memory 3302. The access node 3300 can perform any of the functions in the described embodiments.

Although the present disclosure has been shown and described with reference to various embodiments of the present disclosure, those skilled in the art will understand that various changes in form and details are made therein without departing from the spirit and scope of the present disclosure defined by the accompanying claims and their equivalents.

The invention claimed is:

1. A method of a master node (MN) in a wireless communication system, the method comprising:
    receiving, from a first secondary node (SN), a first message to trigger a change of the first SN, the first message including a list of information on primary secondary cell (PSCell) for a user equipment (UE);
    transmitting, to a second SN, a second message to request an addition of the second SN based on the first message;
    transmitting, to the second SN, a third message to request a release of the second SN; and
    receiving, from the second SN, an acknowledge message for the third message, the acknowledge message including list of information on PSCell and a duration of time the UE stayed in the PSCell.

2. The method of claim 1, wherein the acknowledge message for the third message further includes a cell identity of the PSCell.

3. The method of claim 1, further comprising:
    receiving, from the UE, information indicating secondary cell group (SCG) failure, wherein the information including at least one of information of the SN where a radio connection failure occurs, information of the SN in a last SN change procedure, and a type of radio connection failure.

4. The method of claim 3, further comprising:
    transmitting, to the target SN, a fourth message to report the SCG failure, wherein the fourth message includes at least one of SCG failure information, an identity allocated for the UE by the MN, an identity allocated for the UE by the SN, information of a source SN of a SN change, information of a SN where a SCG radio connection failure occurs, and mobility information.

5. The method of claim 1, wherein the first message further includes SN mobility information related to the change of the SN.

6. A master node (MN) in a wireless communication system, the MN comprising:
    a transceiver; and
    a processor coupled with the transceiver and configured to control to:
        receive, from a first secondary node (SN), a first message to trigger a change of the first SN, the first message including a list of information on primary secondary cell (PSCell) for a user equipment (UE),
        transmit, to a second SN, a second message to request an addition of the second SN based on the first message,
        transmit, to the second SN, a third message to request a release of the second SN, and
        receive, from the second SN, an acknowledge message for the third message, the acknowledge message including list of information on PSCell and a duration of time the UE stayed in the PSCell.

7. The MN of claim 6, wherein the acknowledge message for the third message further includes a cell identity of the PSCell.

8. The MN of claim 6, wherein the processor is configured to control to:
   receive, from the UE, information indicating secondary cell group (SCG) failure, wherein the information including at least one of information of the SN where a radio connection failure occurs, information of the SN in a last SN change procedure, and a type of radio connection failure.

9. The MN of claim 8, wherein the processor is configured to control to:
   transmit, to the target SN, a fourth message to report the SCG failure, wherein the fourth message includes at least one of SCG failure information, an identity allocated for the UE by the MN, an identity allocated for the UE by the SN, information of a source SN of a SN change, information of a SN where a SCG radio connection failure occurs, and mobility information.

10. The MN of claim 6, wherein the first message further includes SN mobility information related to the change of the SN.

* * * * *